United States Patent
Peng

(10) Patent No.: US 9,957,107 B2
(45) Date of Patent: May 1, 2018

(54) AUTOMATED STORAGE AND RETRIEVAL

(71) Applicant: Zhouzhou Peng, Acton, MA (US)

(72) Inventor: Zhouzhou Peng, Acton, MA (US)

( * ) Notice: Subject to any disclaimer, the term of this patent is extended or adjusted under 35 U.S.C. 154(b) by 0 days. days.

(21) Appl. No.: 14/959,485

(22) Filed: Dec. 4, 2015

(65) Prior Publication Data

US 2016/0355339 A1    Dec. 8, 2016

Related U.S. Application Data

(60) Provisional application No. 62/088,036, filed on Dec. 5, 2014.

(51) Int. Cl.
*B65G 1/137* (2006.01)
*B65G 1/04* (2006.01)

(52) U.S. Cl.
CPC ......... *B65G 1/1378* (2013.01); *B65G 1/0457* (2013.01); *B65G 1/0485* (2013.01); *B65G 1/0414* (2013.01); *B65G 1/0492* (2013.01); *B65G 2203/044* (2013.01)

(58) Field of Classification Search
CPC .. B65G 1/1378; B65G 1/0457; B65G 1/0485; B65G 1/0414; B65G 1/0492
See application file for complete search history.

(56) References Cited

U.S. PATENT DOCUMENTS 3,448,870 A * 6/1969 Boissevain .......... B65G 1/1378
198/349

3,472,175 A * 10/1969 Wright ................. B65G 1/0407
104/172.2

(Continued)

FOREIGN PATENT DOCUMENTS

AT    511 137 A1    9/2012
CH    605 345 A5    10/1978

(Continued)

OTHER PUBLICATIONS

Notification of Transmittal of the International Search Report and the Written Opinion of the International Searching Authority for Int'l Application No. PCT/US2015/063991, "Automated Storage and Retrieval System With Two Coupled Rail Systems," dated Mar. 30, 2016.

(Continued)

*Primary Examiner* — Kaitlin S Joerger
(74) *Attorney, Agent, or Firm* — Hamilton, Brook, Smith & Reynolds, P.C.

(57) ABSTRACT

An automated storage system provides for storing and retrieving items at a common storage space, such as a warehouse. The system includes an arrangement of storage rails that support storage containers. A delivery rail network extends adjacent to the storage rails and to human worker-operated workstations. Picker devices, maneuvering along the delivery rail system, operate to locate a selected storage container, decouple the container from the storage rail system, and transport the storage container along a segment of the delivery rail network. A mover device then receives the selected storage container from the picker device and transports the storage container to a workstation, where items can be retrieved from (and/or added to) the storage container by the human worker.

44 Claims, 24 Drawing Sheets

(56) References Cited

U.S. PATENT DOCUMENTS

| | | | |
|---|---|---|---|
| 3,690,478 A * | 9/1972 | Brummett | A41H 43/02 |
| | | | 198/367 |
| 4,773,807 A | 9/1988 | Kroll et al. | |
| 4,813,847 A * | 3/1989 | De Vries | B65G 1/06 |
| | | | 414/281 |
| 6,036,427 A | 3/2000 | Kita et al. | |
| 7,873,469 B2 | 1/2011 | D'Andrea et al. | |
| 7,894,933 B2 | 2/2011 | Mountz et al. | |
| 7,920,962 B2 | 4/2011 | D'Andrea et al. | |
| 7,991,505 B2 * | 8/2011 | Lert, Jr. | B65G 1/0492 |
| | | | 198/347.1 |
| 8,092,140 B2 * | 1/2012 | Baker | B65G 1/1373 |
| | | | 198/347.4 |
| 9,037,286 B2 * | 5/2015 | Lert | B65G 1/1378 |
| | | | 414/279 |
| 9,139,363 B2 * | 9/2015 | Lert | B65G 1/0492 |
| 9,561,905 B2 * | 2/2017 | Toebes | B65G 1/0492 |
| 2001/0051085 A1 | 12/2001 | Klein et al. | |
| 2008/0269960 A1 * | 10/2008 | Kostmann | B65G 1/0407 |
| | | | 701/2 |
| 2014/0288696 A1 | 9/2014 | Lert | |
| 2016/0107838 A1 * | 4/2016 | Swinkels | B66F 9/063 |
| | | | 414/273 |
| 2016/0229634 A1 * | 8/2016 | Yamashita | B65G 1/1378 |
| 2016/0355339 A1 * | 12/2016 | Peng | B65G 1/0457 |

FOREIGN PATENT DOCUMENTS

| | | |
|---|---|---|
| DE | 10 2009 032406 A1 | 1/2011 |
| EP | 0 589 844 A1 | 3/1994 |
| EP | 1 028 074 A1 | 8/2000 |
| EP | 1 452 462 A2 | 9/2004 |
| EP | 2 354 045 A1 | 8/2011 |
| JP | S58 130802 A | 8/1983 |
| JP | S62 83903 A | 4/1987 |
| JP | H09 132305 A | 5/1997 |
| JP | 2000 044010 A | 2/2000 |
| NL | 6 804 046 A | 9/1968 |
| WO | WO 02/20376 A1 | 3/2002 |
| WO | WO 2008/136659 A1 | 11/2008 |
| WO | WO 2012/083055 A1 | 6/2012 |
| WO | WO 2016/090245 A1 | 6/2016 |

OTHER PUBLICATIONS

Notification of Transmittal of the International Preliminary Report on Patentability for Int'l Application No. PCT/US2015/063991, "Automated Storage and Retrieval System With Two Coupled Rail Systems," dated Jun. 15, 2017.

* cited by examiner (FRONT VIEW)

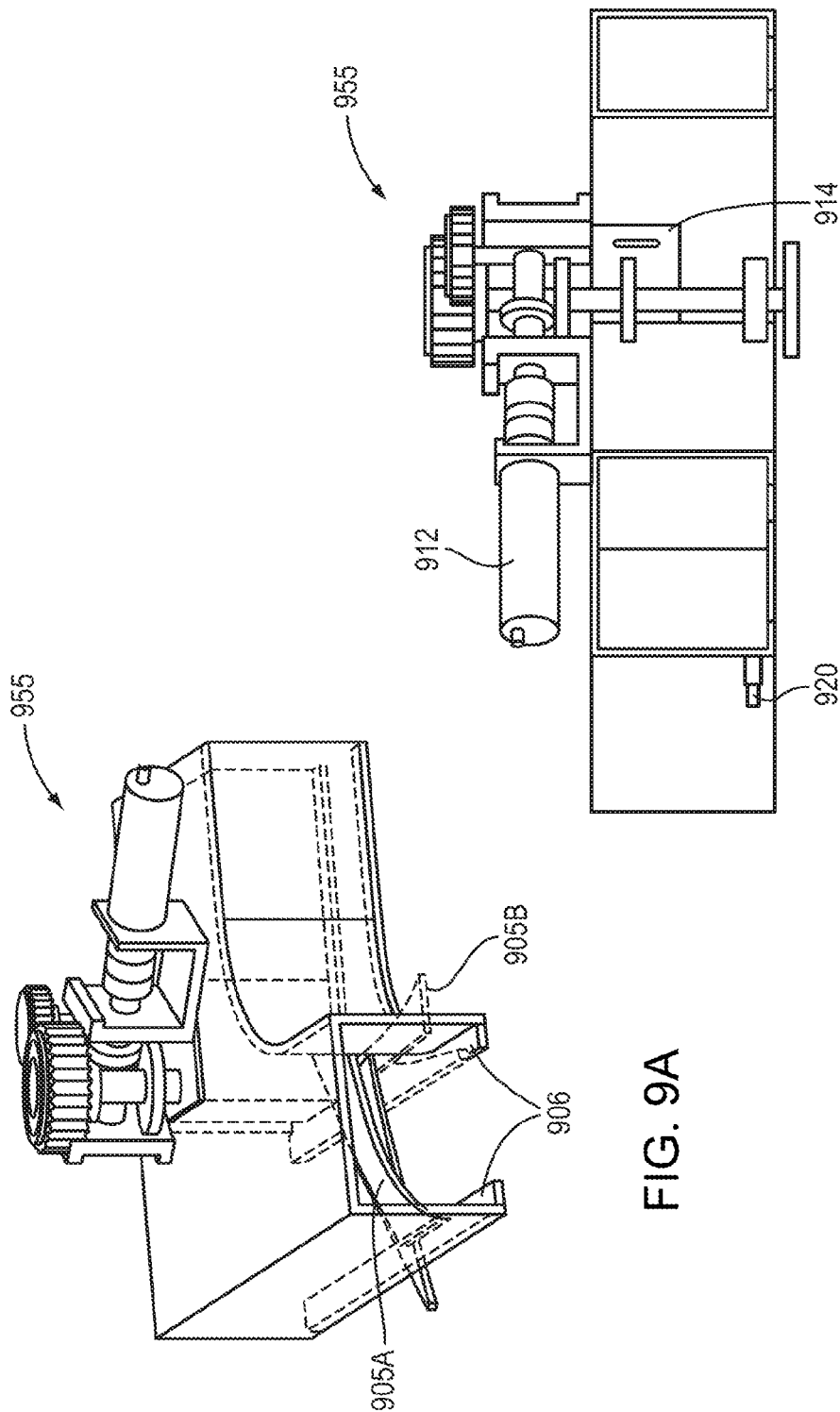

FIG. 13 PICKER

MOVER

AUTOMATED STORAGE AND RETRIEVAL

RELATED APPLICATION

This application claims the benefit of U.S. Provisional Application No. 62/088,036, filed on Dec. 5, 2014. The entire teachings of the above application are incorporated herein by reference.

BACKGROUND OF THE INVENTION

Material handling includes the processes and equipment employed in the transportation, storage, protection, distribution, and control of materials and goods used in other commercial or industrial processes. A typical example of a material handling system is a warehouse, commonly referred to as a distribution center, in which goods are stored in bulk and picked out in smaller quantities to fulfill orders for such goods.

The rapid growth of online retailing in the recent years has placed pressure on warehouse operations. Compared with traditional "brick-and-mortar" stores, online retailers usually have a significantly larger variety of goods, lower prices, receive far more orders, and must compete with one another on providing a superior customer experience. These new developments translate to the need for larger warehouses, larger diversity of goods stored, faster order picking speed, higher fulfillment accuracy, and lower operation cost overall.

In traditional warehouses, which employs human labor to retrieve goods and assemble orders, the "order pickers" (i.e., the workers who retrieve goods from storage) must walk a lot. Typically, about 60%-70% of a worker's time is spent on walking among rows of storage racks, which becomes a significant contribution to the inefficiency of such a warehouse in daily operation. Various managerial techniques, such as zoning and computerized path optimization, can mitigate this problem, but only to a limited extent. Most contemporary automation technologies (e.g., conveyors, carrousels, A-frames, AS/RS) can further reduce walking, but they are all generally expensive, solve the problem only partially, and often are limited to specific types of goods.

One existing automated solution employs a number of floor-level, wheeled robots that link to and move shelves of items between a storage area and a packing area. Such a solution can replace the need for human workers to walk to and from the storage area to retrieve items. However, this solution is expensive and is confined to a two-dimensional surface, and, thus, utilizes the three-dimensional space of a warehouse poorly.

SUMMARY OF THE INVENTION

Example embodiments of the present invention include a system for storing and retrieving items. The system may include first and second rail systems, the first rail system supporting a plurality of storage containers. A picker device, which may include a robot coupled to the second rail system, operates to decouple a selected storage container from the first rail system and transport the storage container along a segment of the second rail system. Further a mover device, which may include an additional robot coupled to the second rail system, may receive the selected storage container from the picker device and transport the storage container further along the second rail system. The first and second rail systems may be two- or three-dimensional or a combination thereof.

In further embodiments, the second rail system may extend to a human workstation, and the mover device may move the selected storage container to the human workstation to enable a user to access the selected storage container. The human workstation may include a plurality of access locations, where the mover transports the selected storage container to a selected one of the access locations based on a received command from a controller. The mover may also enable the user to remove one or more items from the selected storage container, as well as transfer one or more items to the selected storage container. The second rail system may further include one or more moveable segments at the human workstation, where the movable segments may be controlled by a user and/or an automated controller to reposition the selected storage container.

In still further embodiments, following access by a user at a human workstation, one or both of the picker and mover devices may operate to return the selected storage container to storage. For example, the mover device may move the selected storage container toward the first rail system in order to return the storage container to the storage supported by the first rail system. The picker device may receive the selected storage container from the mover device and couple the storage container to the first rail system, such as at a given location of the first rail system. Alternatively, the mover device may move the selected storage container to a predefined location at the first rail system, where the predefined location may be a common point at which the plurality of storage containers are coupled to the first rail system. A pusher device may be configured to move the selected storage container along the first rail system. The pusher device may also move several of the storage containers concurrently.

Yet still further embodiments of the invention may include a method of storing and retrieving items. An order is received for at least one item, such as an item to be retrieved from storage. A storage container containing the item is located, where the storage container may be one of several containers that is supported by a first rail system. A picker device is controlled to move along a second rail system to locate the storage container, decouple the storage container from the first rail system, and transport the selected storage container along a first segment of the second rail system. A mover device is then controlled to transport the selected storage container along a second segment of the second rail system. The mover device may be controlled further to move the selected storage container to a human workstation to enable a user to access the selected storage container.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 9A-B are schematic diagrams of a rail switch.

DETAILED DESCRIPTION OF THE INVENTION

A description of example embodiments of the invention follows.

Figure 1A:
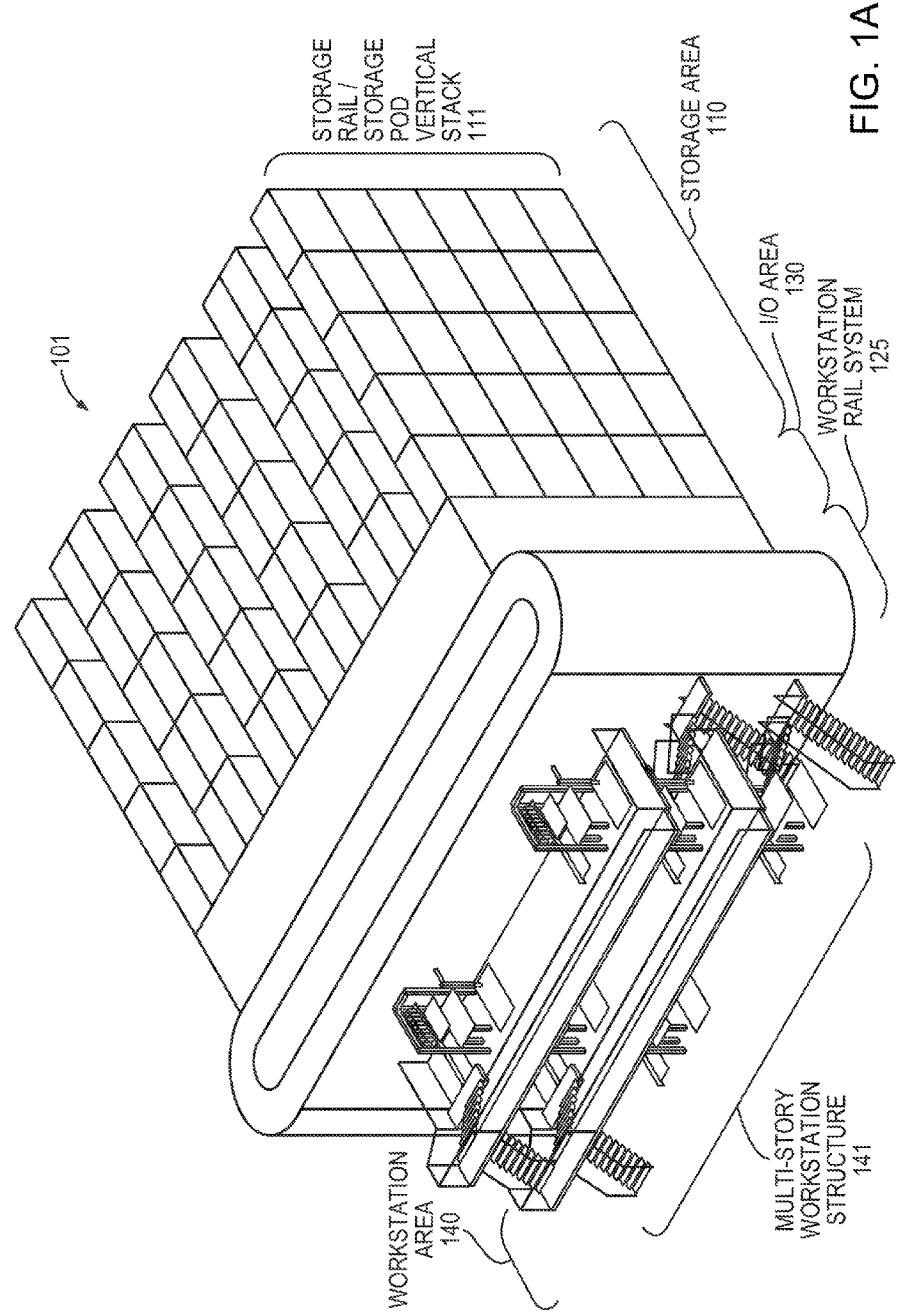
FIG. 1A is a schematic diagram of an automated storage system in one embodiment.

FIG. 1A is a schematic diagram of an automated storage system 101 in one embodiment. The system 101 may include some or all of the features of the system 100 described below with reference to FIG. 1B, including a workstation area 140, workstation rail system 125, I/O area 130, and storage area 110. The system 101 is shown in an isometric projection to illustrate vertical features of the system 101. In particular, the storage area 110 includes a structure of storage rails (such as the storage rails 115A-E of FIG. 1B) stacked vertically relative to one another (in addition to forming horizontal rows), thereby forming a storage rail/storage pod vertical stack 111. Example embodiments of a storage rail structures are described in further detail below with reference to FIGS. 11A-E and 12.

Further, the workstation area 140 may include a multi-story workstation structure 141, which supports workstations (such as the workstations 142A-C of FIG. 1B) on different vertical levels, enabling a greater number of workers to use the system 101 to process orders.

When implemented in applications such as a distribution center, the system 101 provides several advantages over previous approaches. Compared to a traditional warehouse that employs human workers as "pickers" to navigate a storage space and retrieve items, the system 101 can locate and retrieve items far more quickly, and eliminates the extensive walking through the inventory required by human pickers. Maintaining the storage space separate from human workers can also be beneficial to the safety of workers (e.g., storage of unsafe materials), and can prevent the loss of inventory. Further, because the storage area 110 can be isolated from the workstation area 140, a reduced number of video surveillance system to monitor workers can be used. The system 101 can also utilize storage space that would be inaccessible or inconvenient to a human worker (e.g., high vertical space), and can maintain a storage space that is denser than would be possible if navigated by humans. Compared to previous automated solutions, particularly floor-based robotic carriers, the system 101 can provide a lower cost, and can utilize greater vertical space within the storage area. Further, because the pickers 150 and movers 160 are confined to a rail network, directing each of the pickers 150 and movers 160 can be simple relative to the more complex navigation required by a floor-based robotic carriers.

Figure 1B:
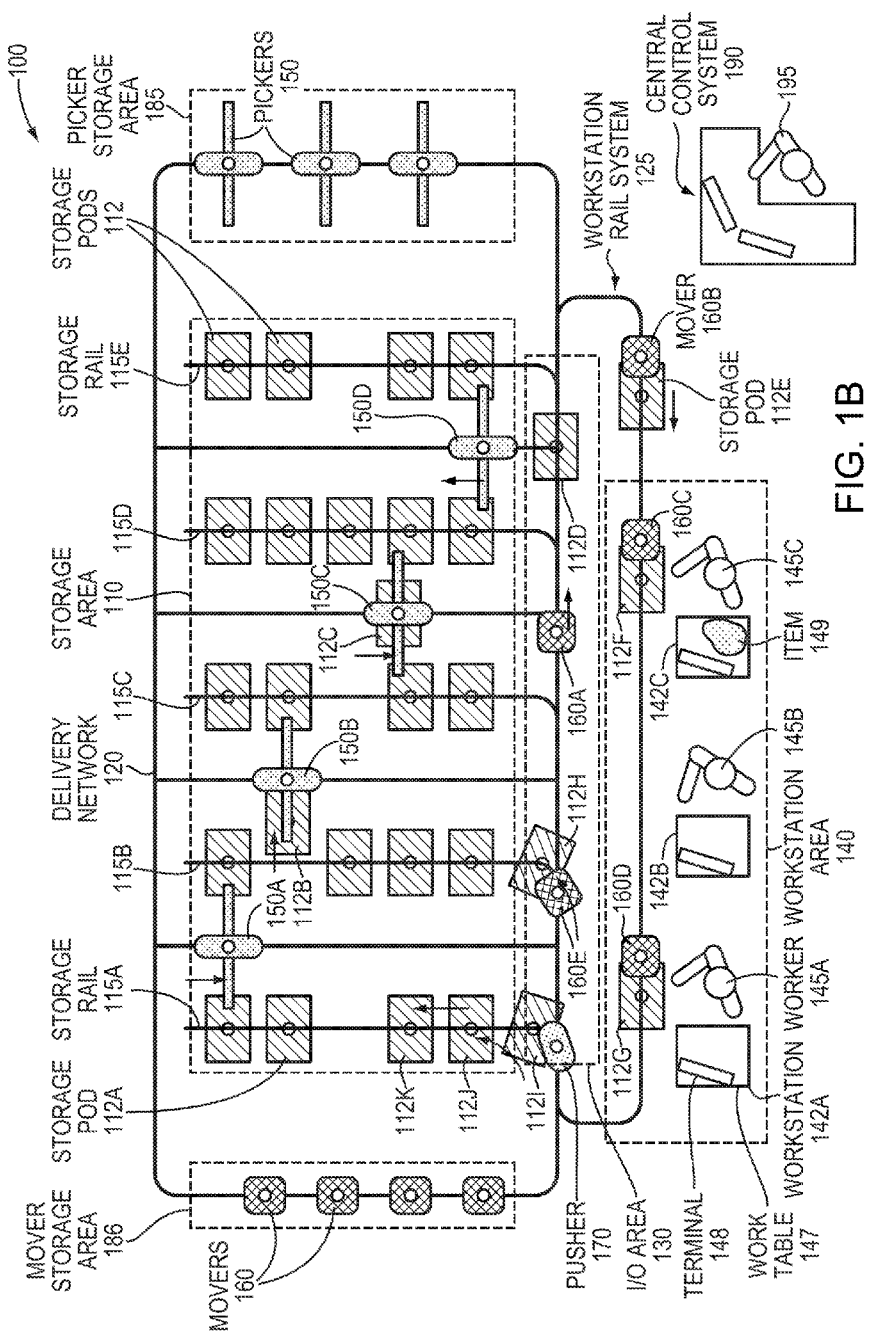
FIG. 1B is a schematic diagram of an automated storage system in a further embodiment.

FIG. 1B is a schematic diagram showing an overhead view of an automated storage system 100 in one embodiment. The system 100 may include some or all of the features of the system 101 described above with reference to FIG. 1A. The system 100 may be implemented, for example, within a warehouse or other storage space serving as a distribution center for goods, where items corresponding to an order are retrieved from storage and assembled into packages to fulfill the order. In the system 100, items are stored in several containers, referred to as "storage pods" 112, which reside in a storage area 110. Remote from the storage area 110 is a workstation area 140. Here, a number of workstations 142A-C are occupied by human workers 145A-C, each of which is tasked with fulfilling orders for items from the storage area 110.

In a typical distribution center, the workers 145A-C (or other employees) would be tasked with walking through the storage area 110 to retrieve items manually from storage bins (not shown), returning the items to the workstation area to be assembled into packages to fulfill corresponding orders. In contrast, the system 100 provides for automated retrieval of selected storage pods 112, where the selected storage pods contain the items corresponding to a given order. The selected storage pods 112 are automatically moved to a selected workstation (e.g., workstation 142A), where a worker (e.g., worker 145A) retrieves the selected item(s) (e.g., item 149) from the selected storage pods 112. Likewise, for moving items into storage (e.g., during a process of replenishing inventory at the distribution center), the system 100 also provides for automatically moving selected storage pods 112 to a selected workstation (e.g., workstation 142A), where a worker (e.g., worker 145A) can add items to the selected storage pods 112. The selected storage pods 112, now housing the new items, are then automatically returned to the storage area 110.

To accomplish this automated storage and retrieval, the system 100 includes a network of rails, including storage rails 115A-E in the storage area 110 and a delivery rail network 120. The storage rails 115A-E may extend horizontally and may be arranged in parallel to one another, forming several rows of storage. Each storage rail 115A-E supports a plurality of storage pods 112, where each of the storage pods 112 is suspended by the respective storage rail 115A-E. Further, each storage pod 112 may include a hanger (described in further detail below) enabling the pod 112 to be removably coupled to the storage rail 115A-E. When coupled to a storage rail 115A-E, the hanger may also enable the storage pod 112 to be moved along the length of the storage rail 115A-E. In particular, a storage pod 112 may be moved along a respective storage rail 115A-E via a push from a neighboring storage pod, or may be moved by an automated device as described in further detail below.

The storage rails 115A-E may also be arranged at a common height above a floor of the storage area 110, or may be positioned at vertically distinct locations. Such an arrangement can be configured such that storage pods 112 occupy any otherwise unused space within the storage area 110, thereby optimizing the use of the space within the storage area 110. Further, additional storage rails (not shown) may be positioned above and/or below each of the storage rails 115A-E. In such an embodiment, the storage rails 115A-E may be considered to occupy a given "level" of the vertical space within the storage area, and additional storage rails may occupy additional levels above and below the given level. As a result, both the vertical and horizontal space within the storage area 110 can be utilized to store a maximum number of storage pods 112. Example embodiments of storage rail structures are described in further detail below with reference to FIGS. 11A-E and 12.

The delivery rail network 120 extends to both the storage area 110 and the workstation area 140, and enables the storage pods 112 to be transported to and from each area 110, 140. In particular, the delivery rail network 120 includes rail segments positioned between the storage rails 115A-E, and these rail segments extend to an input/output (I/O) area 130. Likewise, the storage rails 115A-E may also connect to the delivery rail network 120 at the I/O area 130. From the I/O area 130, the delivery rail network 120 further extends to a workstation rail system 125 in the workstation area 140, including rail segments that are positioned proximate to each of the workstations 142A-C.

For illustrative purposes, both the storage rails 115A-E and the delivery rail network 120 are shown in simplified form in FIG. 1A. In example embodiments of the invention, the storage rails 115A-E and the delivery rail network 120 may include additional rail segments and connections between rail segments. For example, rather than a common rail segment of the network 120 extending to all workstations 142A-C, the network 120 may include separate rail segments extending to each workstation 142A-C in parallel, thereby preventing congestion of the network 120 due to a delay at a given workstation 142A-C. Likewise, the rail network 120 and storage rails 115A-E at the I/O area may extend to multiple parallel rail segments. Active and/or passive rail switches (not shown) may be implemented at each rail connection to facilitate transport along each of the rail segments. Example embodiments of such rail configurations are described in further detail below with reference to FIGS. 4A-9B, and may be implemented in the system 100.

In order to transport the storage pods 112 throughout the delivery rail network 120 and along the storage rails 115A-E, the system 100 includes a number of robotic devices configured to move along the rails and manipulate the storage pods 112. The robotic devices may include pickers 150 and movers 160. In further embodiments, a third type of robotic device, referred to as a pusher 170, may also be employed. Each of the pickers 150, movers 160, and pusher(s) 170 include mounting features and a powered drive system enabling the devices 150, 160, 170 to be coupled to, and move along, the delivery rail network 120. The devices 150, 160, 170 may be mounted above and/or below the rail, and may be powered via an integrated battery and/or an external power source. For example, the delivery rail network 120 may carry (or integrate) a power line that connects to each of the devices 150, 160, 170 when mounted to the rail.

The pickers 150 are generally configured to 1) locate a selected storage pod (e.g., storage pod 112A) among the plurality of storage pods 112; 2) decouple the selected storage pod from its respective storage rail (e.g., storage rail 115A); and 3) move the selected storage pod to the I/O area 130, where the selected storage pod may be acquired by a mover 160 for further transport. In alternative embodiments, the pickers 150 may also be configured to return storage pods 112 from the I/O area 130 to a given one of the storage rails 115A-E, which it may accomplish by approximating the above operations in reverse order.

To provide for locating, decoupling and moving the storage pods 112, the pickers 150 may reside at the rail segments of the delivery rail network 120 that extend between the storage rails 115A-E. For example, pickers 150A-D each reside at a respective rail segment of the network 120 extending between two of the storage rails 115A-E, allowing each picker 150A-D to service its two neighboring storage rails 115A-E (e.g., picker 150A is able to manipulate storage pods 112 at both storage rails 115A and 115B). To provide such service, each of the pickers 150A-D may include stationary or extendable arms to engage with the hanger of each storage pod 112. Each of the pickers 150A-D may reside at its respective rail segment indefinitely. Alternatively, the pickers 150A-D may move to a remote location when not in use. For example, the pickers 150A-D may relocate to a picker storage area 185, which may enable additional pickers 150 to be cycled to the rail segments of the network 120. Meanwhile, pickers 150 at the storage area 185 may be recharged, receive maintenance service, or receive software/firmware updates.

The pickers 150A-E are positioned to illustrate an example picking process. In particular, picker 150A is moving along its respective rail segment to locate a selected storage pod 112A. Picker 150B has located its selected storage pod 112B, decoupled the storage pod 112B from the storage rail 115B, and is moving the storage pod 112B to a position directly beneath the picker 150B for transport. Picker 150C is transporting its selected storage pod 112C down the respective rail segment toward the I/O area 130. Picker 150D, having reached the I/O area 130, releases its selected storage pod 112D at the I/O area 130, reverses direction along the delivery rail network 120 to return to the storage area 110, and awaits for an assignment for a further picking task. Example embodiments of the pickers 150 are described in further detail below with reference to FIG. 13.

The movers 160 are generally configured to 1) locate a selected storage pod (e.g., storage pod 112D) brought to the I/O area 130 by a picker 150, 2) move the selected storage pod from the I/O area 130 to a selected workstation (e.g., workstation 142C) via the delivery rail network 120, and 3) return the selected storage pod to the I/O area 130 once the selected storage pod is no longer required at the selected workstation. In further embodiments, the movers 160 may also move the selected storage pod from the I/O area 130 to a respective storage rail 115A-E.

To provide for locating and moving the storage pods 112, the movers 160 may occupy rail segments of the delivery rail network 120 within the I/O area 130. For example, the mover 160A is located within the I/O area. However, in order to avoid congestion in the I/O area 130, the movers 160 may relocate to a mover storage area 186 when not assigned to an operation. The mover storage area 186 may enable additional movers 160 to be cycled into operation. Meanwhile, movers 160 at the storage area 186 may be recharged, receive maintenance service, or receive software/firmware updates. Although the mover storage area 186 is shown as an area separate from the storage area 110, in further embodiments, the storage area 186 may be integrated into the storage area 110. For example, the delivery rail network 120 may include rail segments that extend into space within the storage area 110 that is unoccupied by storage pods 112 and separate from the path of the pickers 150. Those rail segments may be designated as the storage area for the movers 160, comparable to the mover storage area 186, thereby making efficient use of space within the storage area 110.

To engage with and move a selected storage pod 112, each of the movers 160 may include features to couple with the hanger or another portion of each storage pod 112. The movers 160A-E are positioned to illustrate an example moving process. In particular, mover 160A is moving along the deliver rail network 120 in the I/O area 130 to locate a selected storage pod 112D that was left by the picker 150D. Mover 160B has located its selected storage pod 112E, coupled to the storage pod 112E, and is moving the storage pod 112E toward a selected workstation 142B in the workstation area 140. Movers 160C-D, having arrived at their selected workstations 142A, 142C, have parked their respective storage pods 112F-G while workers 145A, 145C at each workstation remove items from (and/or add items to) the storage pods 112F-G. When the item exchange is complete at the workstations 142A, 142C, the movers 160C-D move their respective storage pods 112F-G to the I/O area 130. Alternatively, the movers 160C-D may provide further transport, moving their respective storage pods 112F-G onto a selected storage rail 115A-E. For example, mover 160E is shown to be moving its respective storage pod 112H onto the storage rail 115B, and such movement may, in turn, push other storage pods 112 on the storage rail 115B farther down the rail. Upon moving respective storage pods 112 to the I/O area 130 or to a storage rail 115A-E, the movers 160 may relocate to the storage area 186 and await an assignment for a further moving task. Example embodiments of the movers 160 are described in further detail below with reference to FIGS. 14A-C and 15.

In addition to the movers 160 and pickers 150, pusher devices, such as the pusher 170, may also be implemented to manipulate storage pods 112. The pusher 170 may be configured to move along a predefined rail portion, moving any storage pods 112 coupled to that rail portion in a given direction. As such, the pusher 170 can serve a number of functions, including 1) pushing storage pods 112 from the I/O area onto a respective storage rail (e.g., storage rail 115A); 2) pushing several storage pods 112 on a storage rail 115A together, thereby condensing the storage pods 112 and creating space to accommodate additional storage pods 112; and 3) assisting in transporting a storage pod up a rail segment having an ascending incline. As shown, for example, the pusher 170 is performing both functions (1) and (2). Here, the pusher 170 is moving the storage pod 112I out of the I/O area 130 and onto the selected storage rail 115A. In doing so, the pusher 170 is also pushing two other storage pods 112J, 112K farther along the storage rail 115A, thereby ensuring that the space adjacent to storage pod 112A is occupied. In further embodiments, several pushers comparable to the pusher 170 may be employed. For example, each storage rail 115A-E may have a respective pusher configured as the pusher 170, moving storage pods 112 from the I/O area 130 onto the storage rail 115A-E. In such an embodiment, when returning a storage pod 112, the movers 160 may only be required to move a storage pod 112 to the I/O area 130, in contrast to the function performed by the mover 160E. Example embodiments of the pusher 170 are described in further detail below with reference to FIGS. 16A-D.

Each workstation 145A-C, as described above, is a location at which a respective worker 145A-C interacts with received storage pods, such as the storage pods 112F, 112G. In an application in a distribution center, the workers 145A-C generally interact with the received storage pods 112F, 112G to 1) remove item(s) (e.g., item 149) from the storage pod to fulfill an order for those items, 2) add items(s) to the storage pod to replenish stock of those items in the storage area 110, or 3) both of the above. An example process of (1), also referred to as a "picking process," is described below with reference to FIG. 2. An example process of (2), also referred to as a "replenishment process," is described in further detail below with reference to FIG. 3. To enable the workers 145A-C to complete these tasks, each workstation 142A-C may be equipped with any required equipment and materials, such as packing materials. In addition, each workstation 142A-C may include a terminal (e.g., terminal 148) providing information and instructions to the worker 145A-C to complete each task. For example, during a picking process, the terminal 148 may display information about a current order to be fulfilled, including the location within the received storage pod 112 where a selected item may be found. Conversely, when undergoing a replenishment process, the worker 145A-C may enter into the terminal 148 an identifier of item(s) to be added to the storage area 110. In response, the terminal 148 issues a request for a storage pod 112 having a bin available to store the item(s).

In some embodiments, the storage bins have multiple defined compartments defined by separators (not shown). The compartments may be equipped with illumination sources (e.g., LEDs) that are activated in correspondence with the items to be retrieved or refilled through the synchronizations with the workstation terminals. Alternatively, illumination sources (e.g., lasers) can be mounted to the workstation for highlighting a given compartment. The synchronization can be done wirelessly, for example, via a workstation or warehouse-wide wireless connection. Illumination compartments corresponding to items within an order or refilling list can improve worker efficiency.

The system 100 may be managed and controlled by a central control system 190, which can include a number of computer terminals, servers, and network communications equipment, which may be managed by one or more operators 195, or which may be done through automated processes, such as sophisticated scheduling processes for process flow control known in the art. Under normal operations (e.g., completing picking and retrieval processes), the central control system 190 may operate independently of human input, where the operator 195 optional oversight and management, as well as manual override control of the system 100. In general, the central control system 190 may monitor, control and manage all automated equipment of the system 100, and communicate with the workers 145A-C via terminals 148 to issue orders and fulfill requests. For example, the control system 190 may receive requests for orders to be fulfilled (e.g., from an external source), and then direct both the workers 145A-C and the pickers 150 and movers 160 to fulfill those orders. The control system may communicate and control the pickers 150 and movers 160 wirelessly (e.g., via wireless network communications), or through wired channels connected to each of the pickers 150 and movers 160. The control system 190 may provide a varying degree of control over the pickers 150 and movers 160, dependent on the autonomy configured to the pickers 150 and movers 160. For example, the control system 190 may "micromanage" each action taken by a picker 150 to locate and move a selected storage pod 112, or may simply issue a request to the picker 150 with an identifier of the selected storage pod 112. Example picking and replenishment processes, which may be managed by the central control system 190, are described in further detail below.

In further embodiments, the system 100 may be implemented, with appropriate modifications, in applications other than a distribution center. For example, the system 100 may be employed to provide for personal storage for a number of clients. In such an embodiment, the workstations 142A-C would be configured as kiosks at which a client (in place of a worker 145A-C) may operate the terminal to request to retrieve item(s) from and/or place item(s) in the storage area 110. In response, the system 100 may provide storage pod(s) 112 to the client in a manner comparable to the picking and replenishment processes described above.

In yet a further embodiment, the system 100 may be employed to provide an automated storage of consumer goods and an automated point of sale that interfaces directly with a customer. In such an embodiment, the workstations 142A-C would be configured as customer kiosks at which a customer (in place of a worker 145A-C) may operate the terminal to purchase items stored in the storage area 110. In response, the system 100 may provide storage pod(s) 112 to the customer in a manner comparable to the picking process described above. In such an embodiment, the storage pods 112 and/or the customer kiosks may be configured to enable the customer to access only the purchased items from the retrieved storage pod 112 or compartment defined therein.

Figures 2, 2A:
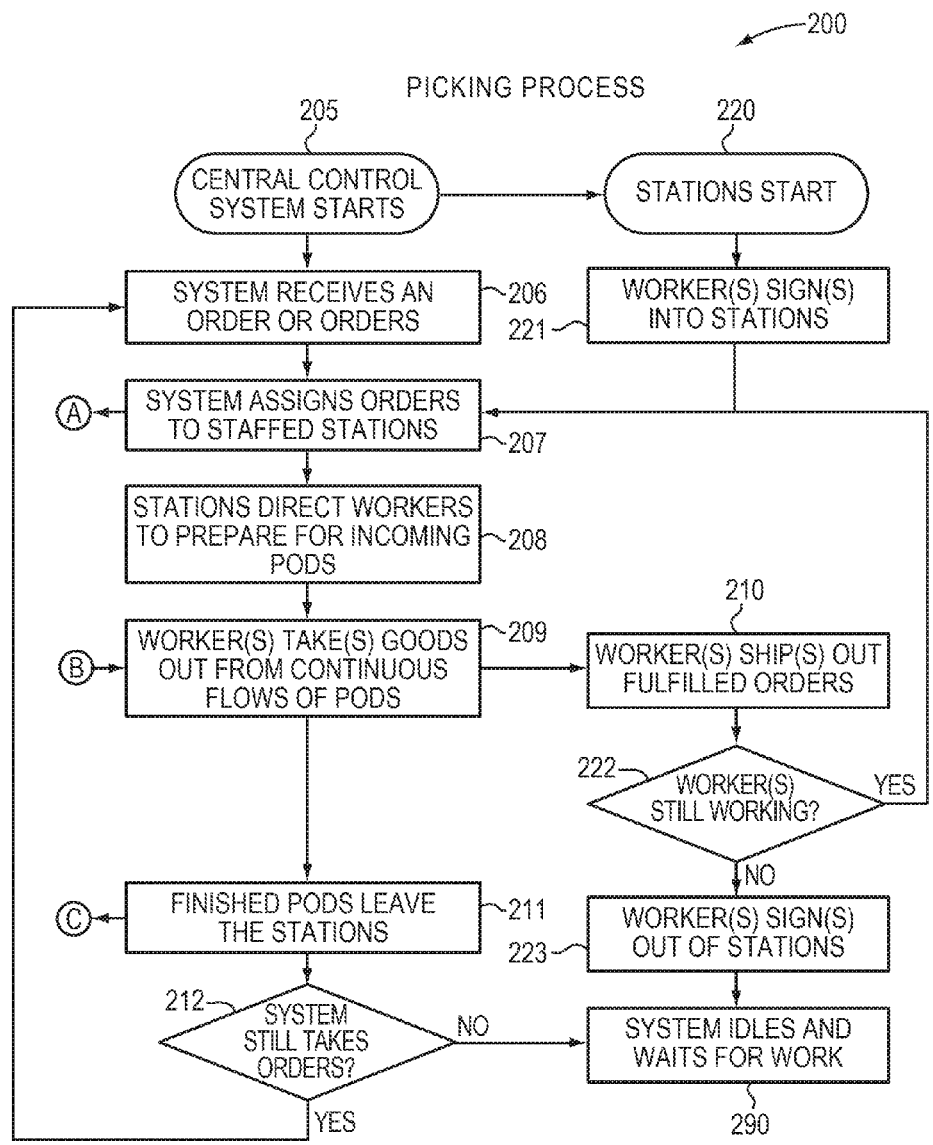
FIG. 2 is a flow diagram of a process of retrieving an item from storage in one embodiment.
Figure 2B:
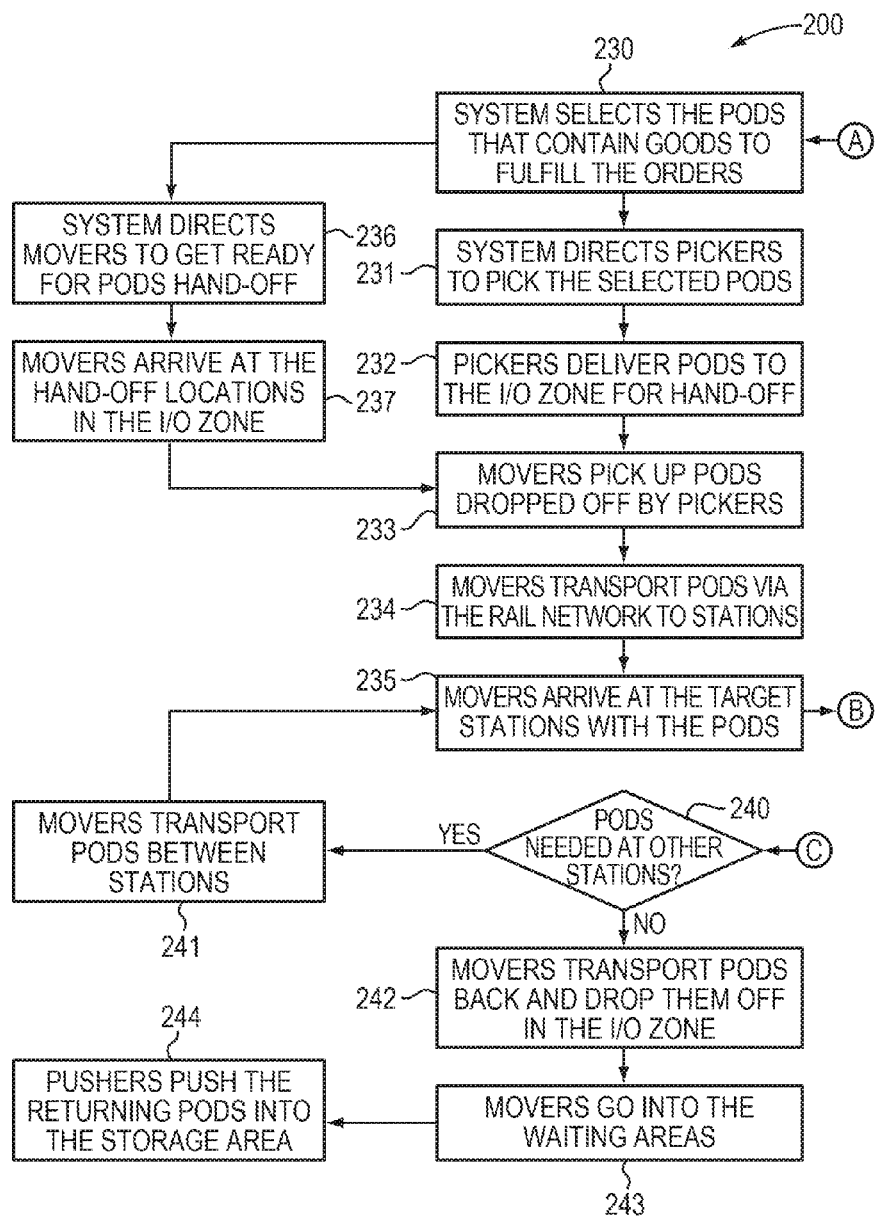

FIG. 2 is a flow diagram of an example process 200 of retrieving an item or items from storage, also referred to above as a picking process. The process 200 may be carried out by a system such as the systems 100, 101 described above. With reference to FIG. 1B, upon startup of the central control system 190 (205) and the workstations 142A-C (220), the control system 190 receives one or more orders for items in the storage area 110 (206), while workers 145A-C sign into their assigned workstations 142A-C (221). The control system 190 then assigns the order(s) to staffed workstations 142A-C (207), and identifies and selects the storage pods 112 that contain the items indicated in the order(s) (230). The control system 190 then directs the movers 160 and pickers 150 simultaneously, directing one or more pickers 150 to pick the selected storage pods 112 (231), and directing one or more movers 160 to move to assigned locations in the I/O zone 130 to receive the selected storage pods 112 (236). In response, the movers 150 move to the I/O area 130 at their assigned locations (237), while the pickers 150 deliver the selected storage pods 112 to the I/O area 130 for hand-off to the movers 160 (232). The movers 160 then pick up the selected storage pods 112 (233), and then transport the storage pods 112 along the delivery rail network 120 toward the workstations 142A-C (234), eventually arriving at the target workstation 142A-C with the selected storage pods 112 (235).

The workers 145A-C, having been directed by their workstation terminals 148 to prepare for incoming storage pods 112 (208), receive the storage pods 112 as delivered by the movers 160 and remove the selected item(s) from the selected storage pods 112 as they are presented to the worker 145A-C in turn (209). When a given storage pod 112 is no longer needed at a particular workstation (e.g., workstation 142A) (211), or if the storage pod is required at another workstation (e.g., workstation 142B) (240), then the respective mover moves the given storage pod 112 to the other workstation 142B (241). If not, then the movers 150 move the storage pods 112 along the rail network 120 and drop them off in the I/O zone 130 near a selected storage rail 115A-E (242), and then return to the mover storage area 186 (243). Pushers (e.g., pusher 170) assigned to a given storage rail then push the storage pods 112 along the storage rails 115A-E, returning the storage pods 112 to the storage area 110 (244).

The above operations may be repeated if any new orders are received to the system 100 (212). Meanwhile, the workers 145A-C complete and ship out fulfilled orders (e.g., forwarding for mailing packages containing the ordered items) (210). The workstations 142A-C may continue to operate as long as the workers 145A-C continue working to fulfill orders (222); otherwise, the workers 145A-C may sign out of their workstations 142A-C (223). Once this occurs and all orders are complete, the control system 190 may idle and await further work (290).

Figure 3A:
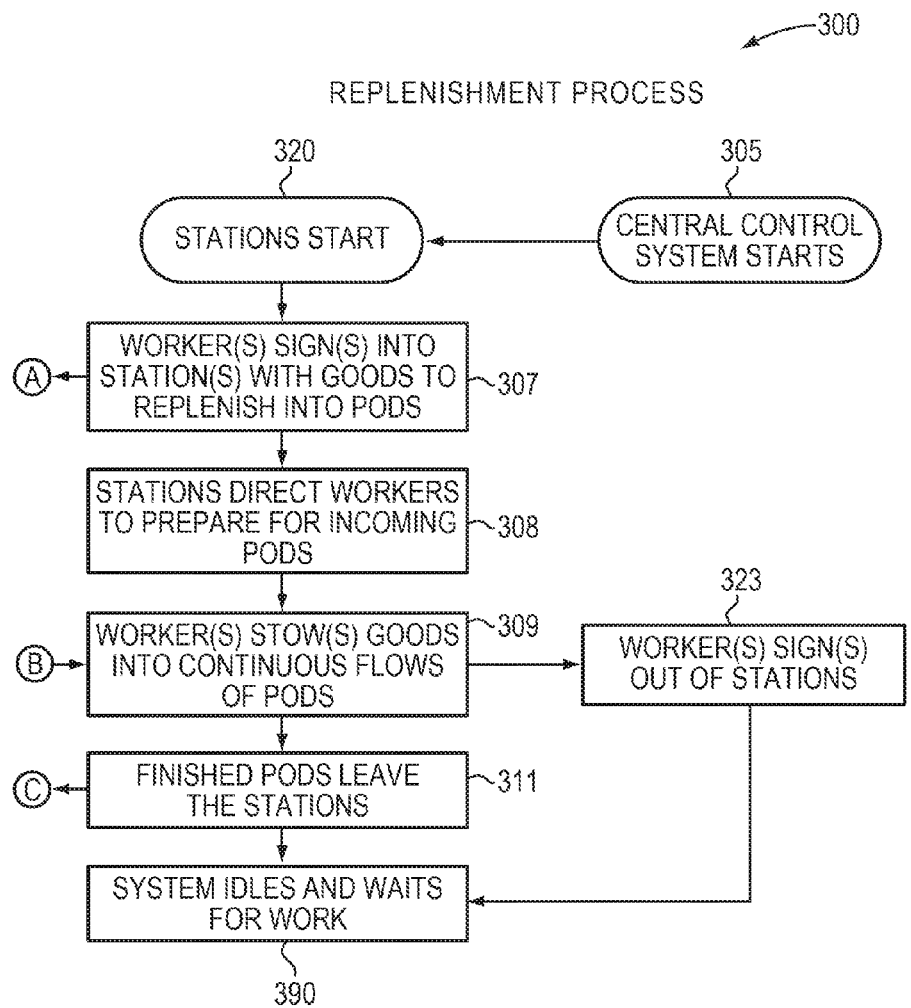
FIG. 3 is a flow diagram of a process of returning an item to storage in one embodiment.
Figure 3:
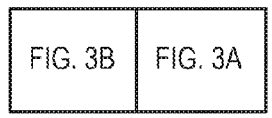
Figure 3B:
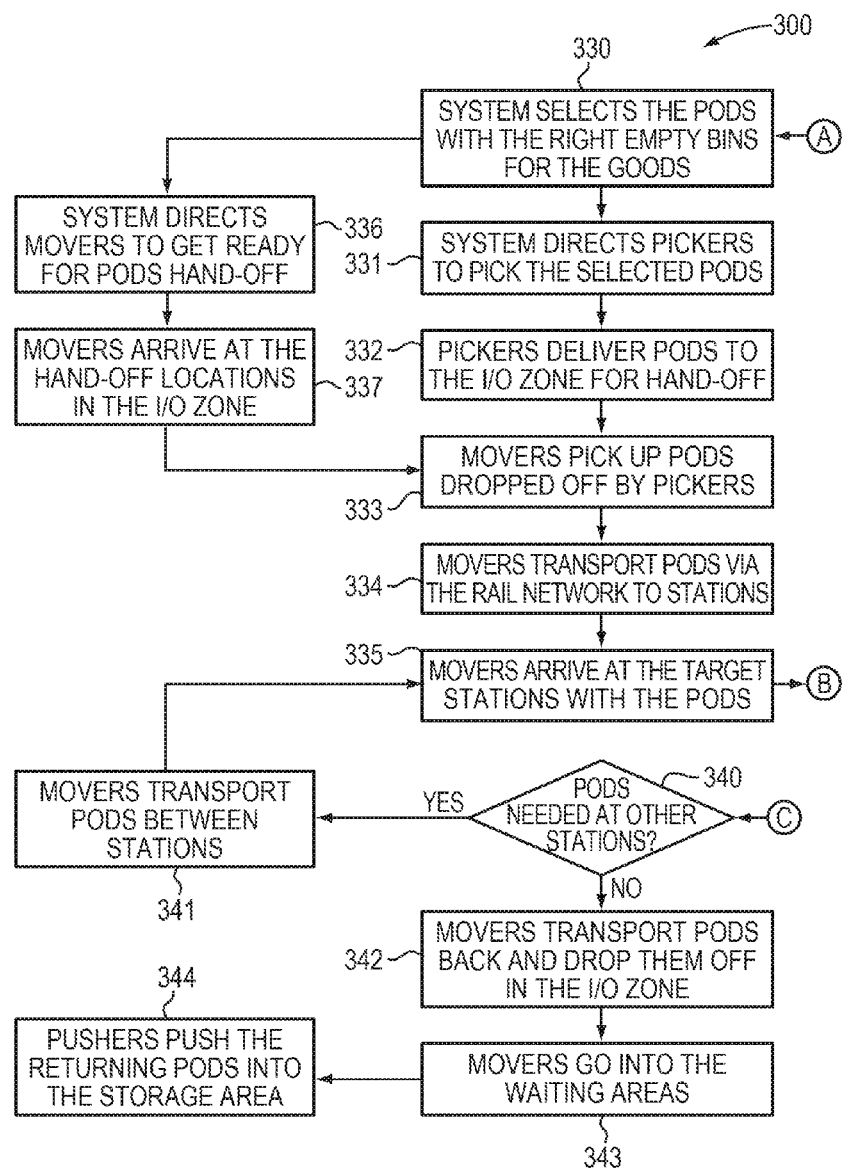

FIG. 3 is a flow diagram of an example process 300 of putting an item or items to storage, also referred to as a replenishment process. The process 300 may be carried out by a system such as the systems 100, 101 described above. With reference to FIG. 1B, upon startup of the central control system 190 (305) and the workstations 142A-C (320), the workers 145A-C sign into their assigned workstations 142A-C with items (e.g., item 149) to replenish into storage pods 112 (307). The control system 190 then identifies and selects the storage pods 112 that contain the appropriate empty bin(s) for the item(s) (330). The control system 190 then directs the movers 160 and pickers 150 simultaneously, directing one or more pickers 150 to pick the selected storage pods 112 (331), and directing one or more movers 160 to move to assigned locations in the I/O zone 130 to receive the selected storage pods 112 (336). In response, the movers 150 move to the I/O area 130 at their assigned locations (337), while the pickers 150 deliver the selected storage pods 112 to the I/O area 130 for hand-off to the movers 160 (332). The movers 160 then pick up the selected storage pods 112 (333), and then transport the storage pods 113 along the delivery rail network 130 toward the workstations 143A-C (334), eventually arriving at the target workstation 143A-C with the selected storage pods 113 (335).

The workers 145A-C, having been directed by their workstation terminals 148 to prepare for incoming storage pods 112 (308), receive the storage pods 112 as delivered by the movers 160 and add the selected item(s) to the selected storage pods 112 as they are presented to the worker 145A-C in turn (309). When a given storage pod 112 are no longer needed at a particular workstation (e.g., workstation 142A) (311), if the storage pod is required at another workstation (e.g., workstation 142B) (340), then the respective mover moves the given storage pod 112 to the other workstation 142B (341). If not, then the movers 150 move the storage pods 112 along the rail network 120 and drop them off in the I/O zone 130 near a selected storage rail 115A-E (342), thereafter returning to the mover storage area 186 (343). Pushers (e.g., pusher 170) assigned to a given storage rail then push the storage pods 112 along the storage rails 115A-E, returning the storage pods 112 to the storage area 110 (344).

Once the workers 145A-C have completed stowing their items to the selected storage pods 112, the workers 145A-C may sign out of their workstations 142A-C (323). Once this occurs and all storage pods 112 have been returned to the storage area 110, the control system 190 may idle and await further work (390). In further embodiments, the replenishment process 300 may be run concurrently with a picking process (e.g., process 200 of FIG. —2) by the same system 100.

Figure 4A:
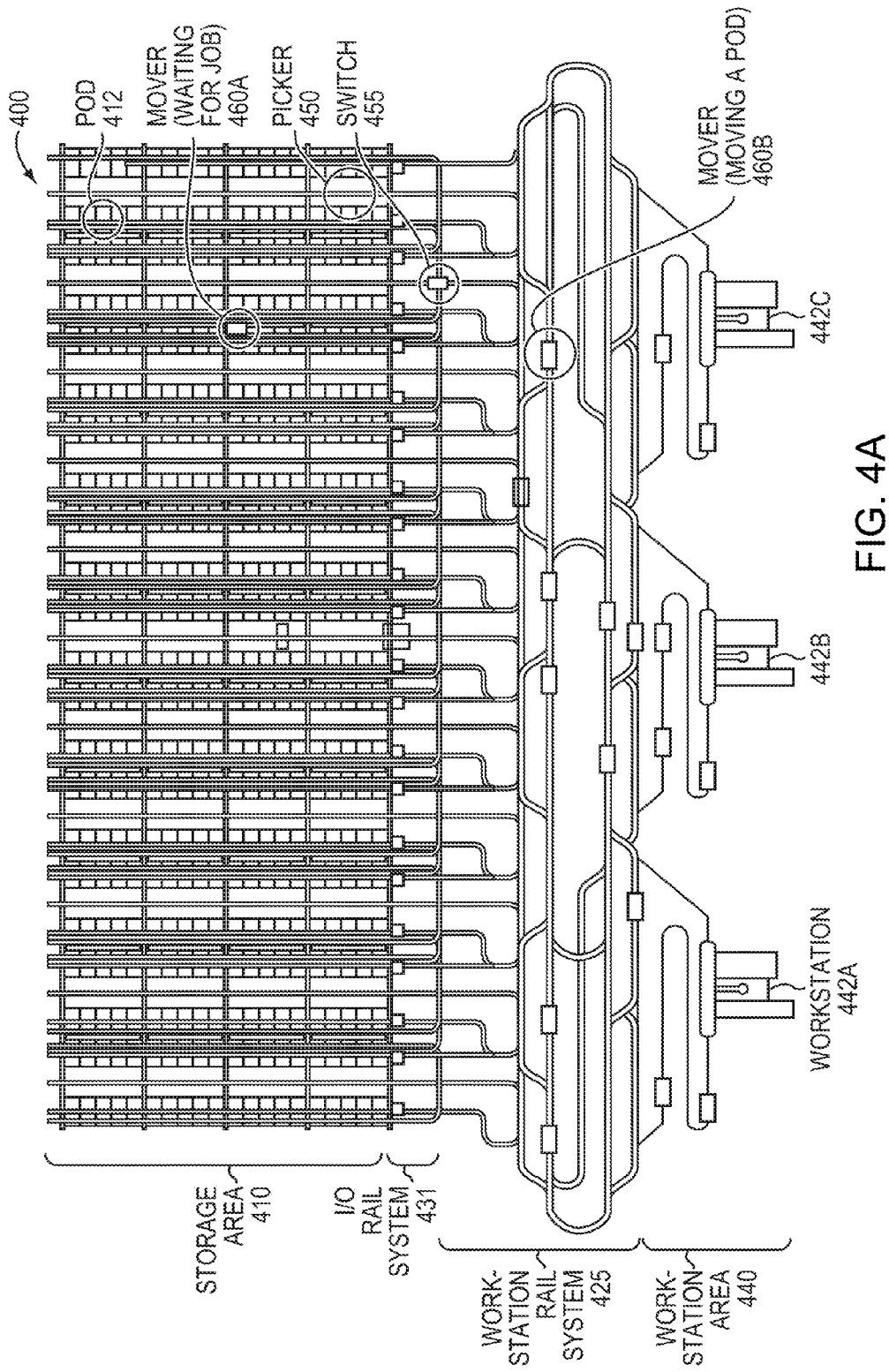
FIGS. 4A-B are schematic diagrams of an automated storage system in a further embodiment.
Figure 4B:
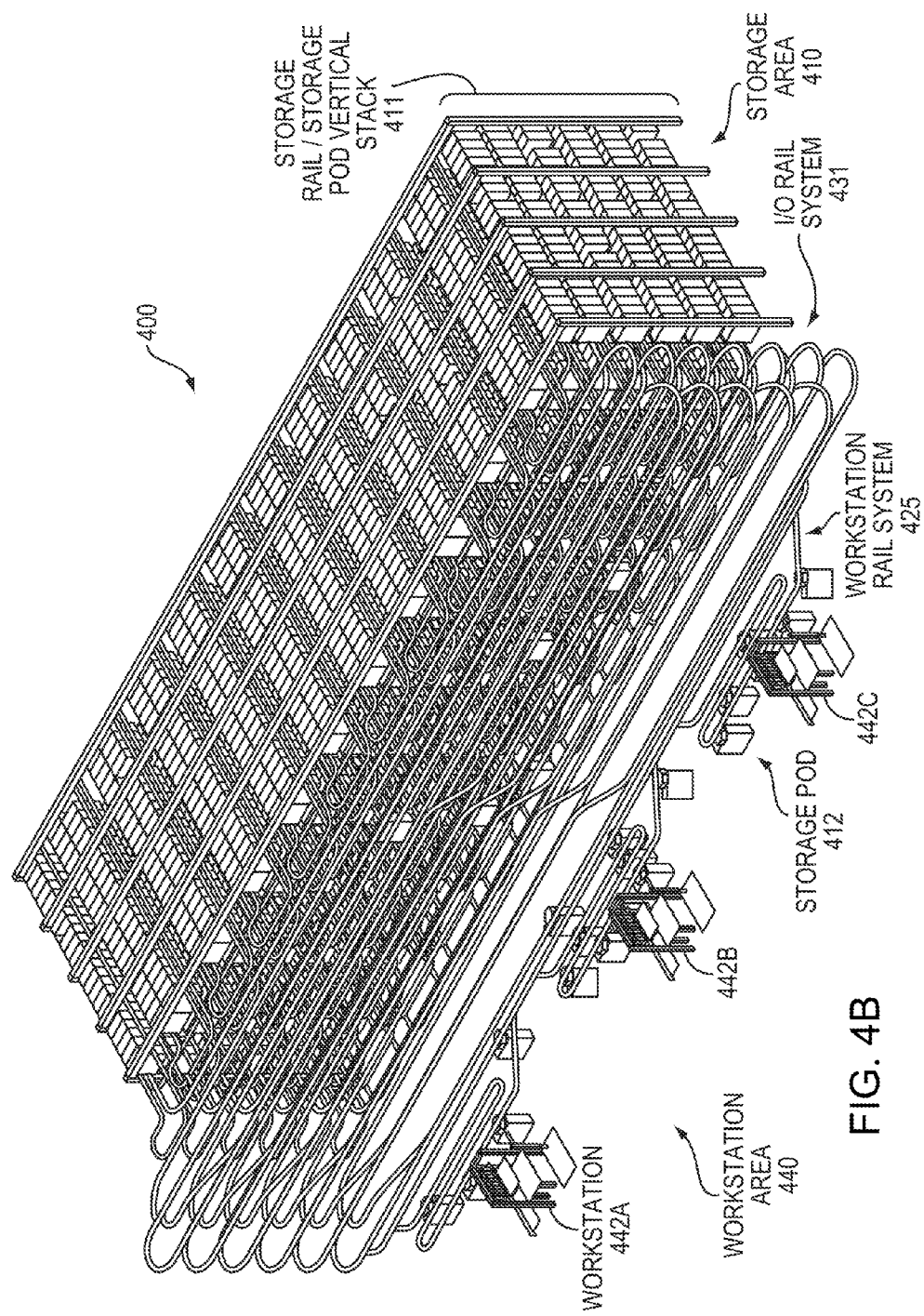

FIGS. 4A-B are schematic diagrams of an automated storage system 400 in a further embodiment. FIG. 4A provides a top-down view, while FIG. 4B provides an isometric view of the system 400. The system 400 may include some or all of the features of the systems 100, 101 described above with reference to FIGS. 1A-B, including a workstation area 440 with workstations 442A-C, workstation rail system 425, I/O rail system 431, and storage area 410. In addition, a representative storage pod 412, mover 460A (idling), mover 460B (moving a storage pod), picker 450, and rail switch 455, are highlighted for illustrative purposes.

The top-down view of the system 400, shown in FIG. 4A, illustrates an example configuration of a rail network including the I/O rail system 431, workstation rail system 425, and the rail segments extending to the workstation area 440. In particular, the rail network is configured with a number of segments joined by rail switches to enable a sufficient volume of storage pods to be transported to and from the storage area 410 without congestion. Further, the top-down view of the system 400, shown in FIG. 4B, illustrates the arrangement of storage rails and storage pods in the storage area forming a vertical stack 411, as well as the vertical configuration of the rail network, which provides for elevating and lowering storage pods to and from a given level in the vertical stack 411.

Figure 5:
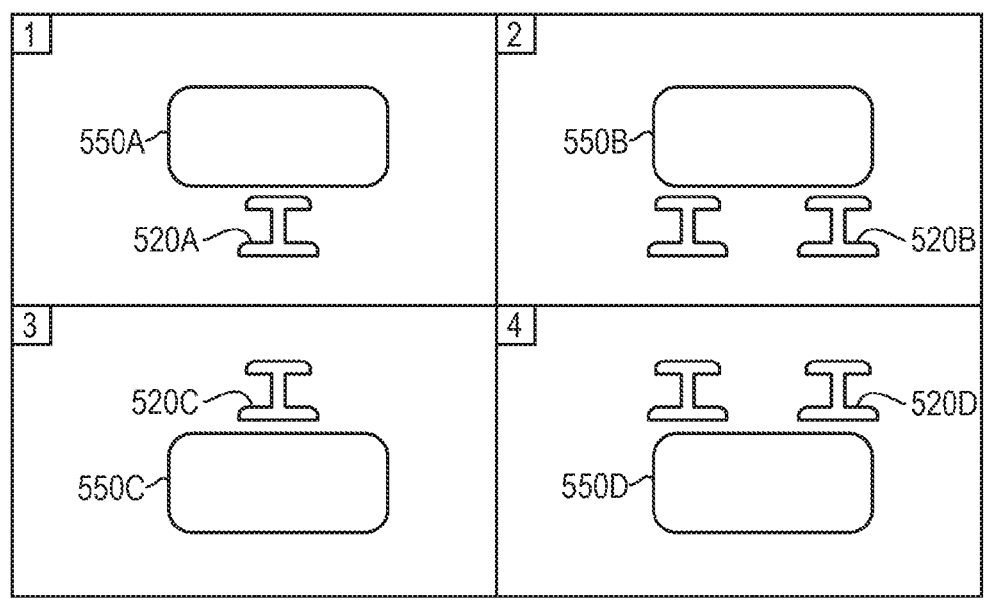
FIG. 5 is a diagram of different rail configurations.
Figure 6:
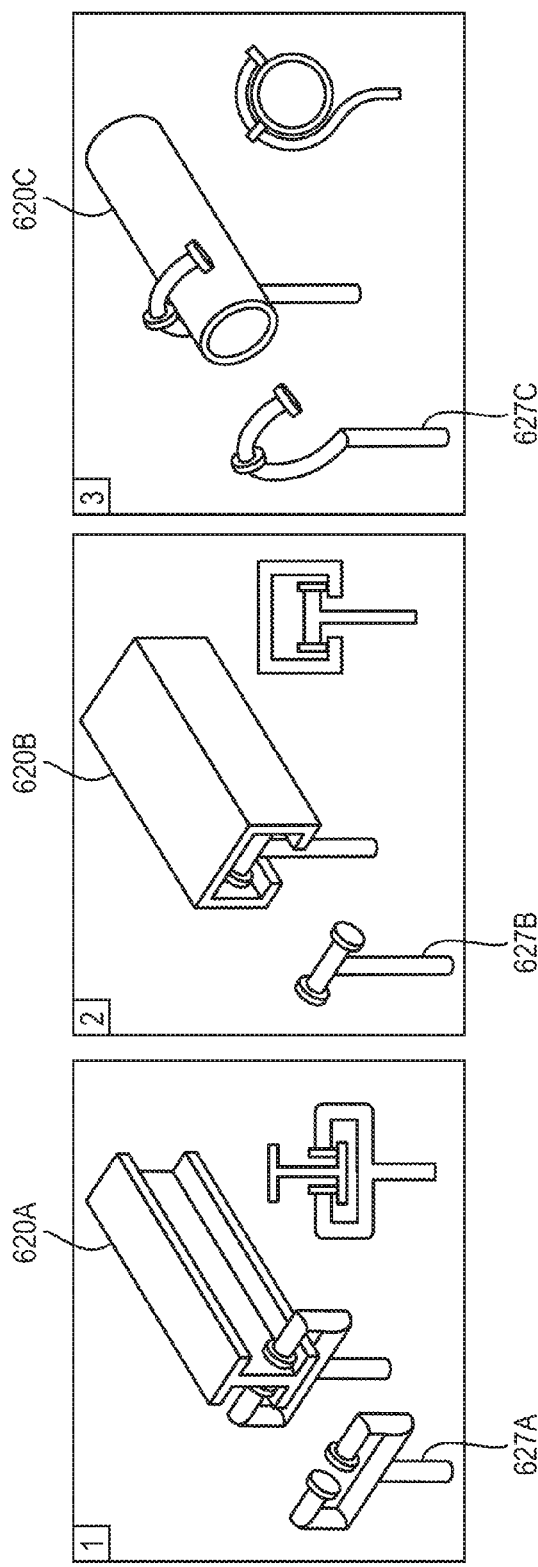
FIGS. 6A-C are diagrams showing different rail types and respective hangers.

FIG. 5 is a diagram of example rail and device configurations from a front view. In frame 1, a device 550A (e.g., a picker or mover) is positioned above a single rail 520A. In frame 2, a device 550B is positioned above a double rail arrangement 520B. In frame 3, a device 550C is positioned below a single rail 520C. In frame 4, a device 550D is positioned below a double rail arrangement 520D. In example embodiments described below, a configuration comparable to frame 3, where a device is positioned below a single rail, is implemented. However, further embodiments of the invention may utilize any of the above configurations.

FIGS. 6A-C are diagrams showing different rail types and respective hangers. In FIG. 6A, an "I-beam" type rail 620A is shown, and the respective hanger 627A forms a shape to encompass the bottom portion of the rail 620A. In FIG. 6B, an open, rectangular rail 620B is shown, and the respective hanger 627B forms a "T" shape to occupy the lower internal surface of the rail 620B. In FIG. 6C, a cylindrical rail 620C is shown, and the respective hanger 627C forms a hook shape to encompass a top portion of the rail 620C. All of the hangers 627A-C may include wheels or other features at the points of contact with the respective rail 620A-C to enable movement along the rail 620A-C. In example embodiments described below, rails and hangers comparable to the rail 620B and the hanger 627B of FIG. 6B are implemented. However, further embodiments of the invention may utilize any of the above rails and hangers, as well as other hanger and rail configurations.

Figure 7:
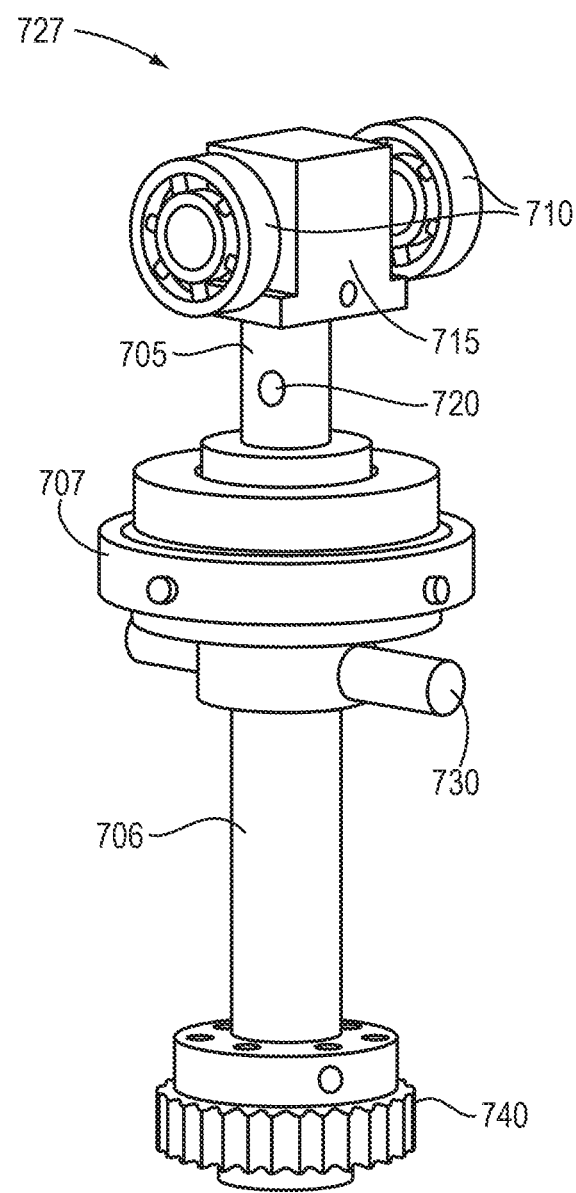
FIG. 7 is a schematic diagram of a hanger in one embodiment.

FIG. 7 is a schematic diagram of a hanger 727 in one embodiment. The hanger 727 may be utilized by a storage pod for coupling to, and moving along, a rail. The hanger 727 includes an upper body 705, which supports a pair of wheels 710 configured to run along a rail, and a lower body 706, which connects to, for example, the center of the top of a storage pod. Joining the upper body 705 and lower body 706 is a link 707 that enables the upper body and lower body 705, 706 to rotate independently of one another. The link 707 may also include a locking mechanism (not shown) to selectively prevent such rotation.

The wheels 710 are supported by a block 715, and the upper body 705 may also include a hole 720 that can receive a pin from a mover to reduce rattling of the wheels 710 during transport. A pair of nubs 730 provide features that allow the hanger 727 to be grabbed and raised by a picker during a picking operation. A gear 740 is positioned to engage with gear racks located along a rail, causing the lower body 706 and storage pod to rotate when the link 707 is unlocked.

Reasons for rotation can be to align storage pods to pass each other along adjacent rails, to rotate the storage pods for worker access to items contained therein, or to enable the storage pods to pass through narrow gaps of the rails and the superstructure of a warehouse. Further, some embodiments may employ motors (not shown) to provide the rotational force rather than the passive interaction between the gears 740 and corresponding gear racks located along the rails.

Figure 8A:
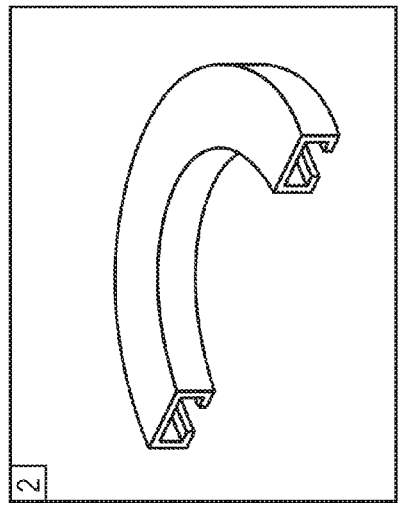
FIGS. 8A-D are schematic diagrams of different curved rail examples.
Figure 8B:
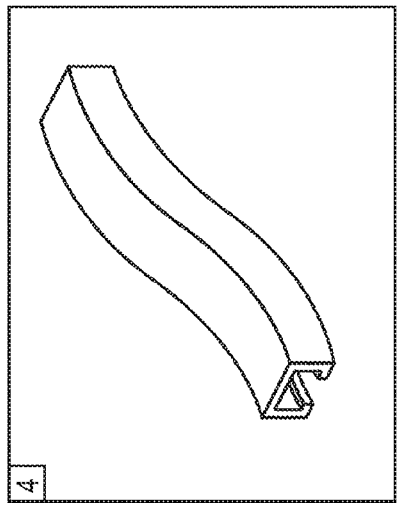
Figure 8C:
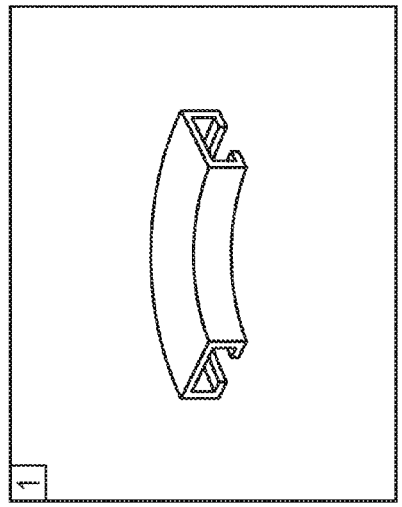
Figure 8D:
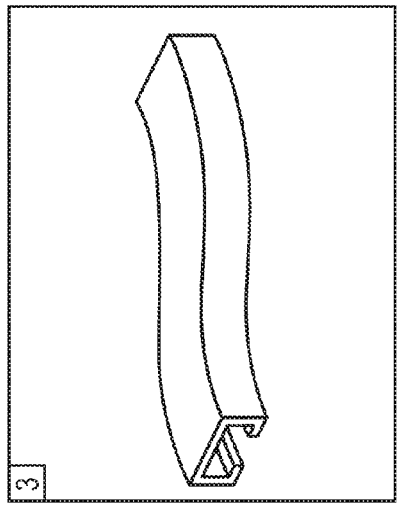

FIGS. 8A-D illustrate example curved rail segments, which are curved variants of the rail 620B in FIG. 6B. FIG. 8A illustrates a rail having a 90-degree curve; FIG. 8B illustrates a rail having a 180-degree curve; FIG. 8C illustrates a rail having a parallel shift; and FIG. 8D illustrates a rail having a vertical shift. All such rail segments can be implemented as necessary in the rail networks described above.

FIGS. 9A-B are schematic diagrams of an example rail switch 955, which can be implemented in the rail networks described above to provide path switching at junctions in the rail 920. The switch 955 can be an active switch (as shown) that is actuated by a central control system, or can be a passive switch that is mechanically operated by an incoming device (e.g., a mover). As shown in FIG. 9A, a track guide (905A-B) resides at the bottom of the rail 920. The track guide 905A-B can direct a device toward a first or second rail segment depending on whether it occupies the first position (905A) or the second position (905B). Notches 906 in the rail 920 assist in supporting the track guide 905A-B in each position.

As shown in FIG. 9B, the switch 955 further includes motors 912, 914 for actuating the track guide 905A-B between the first and second positions. The switch 955 may also include a communications device (e.g., a wireless or wired network link) enabling the switch to be controlled by a central control system. Alternatively, the switch 955 may be controlled by a device (e.g., a mover) as it approaches the rail junction occupied by the switch 955.

Figure 10A:
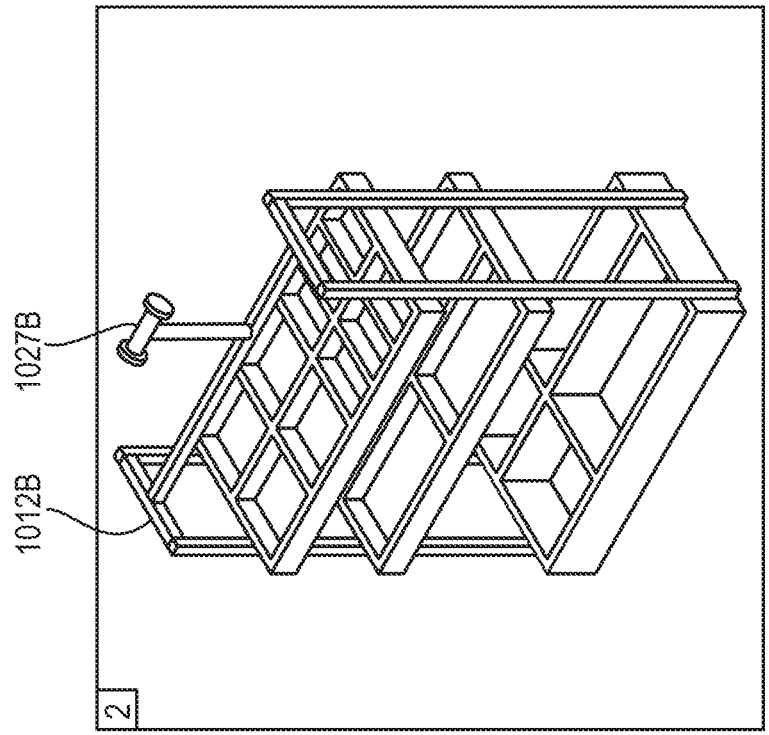
FIGS. 10A-C are schematic diagrams of example storage pods.
Figure 10B:
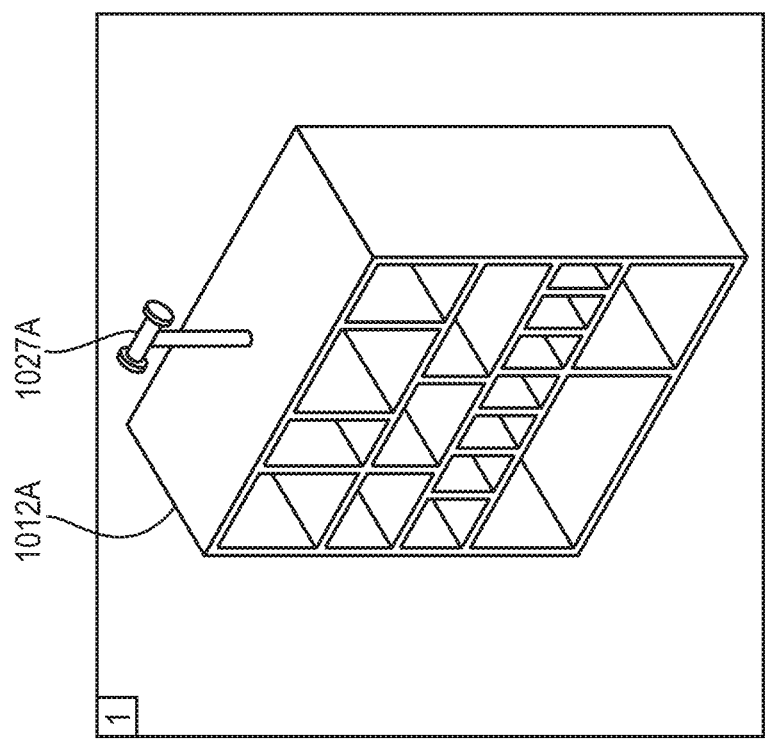
Figure 10C:
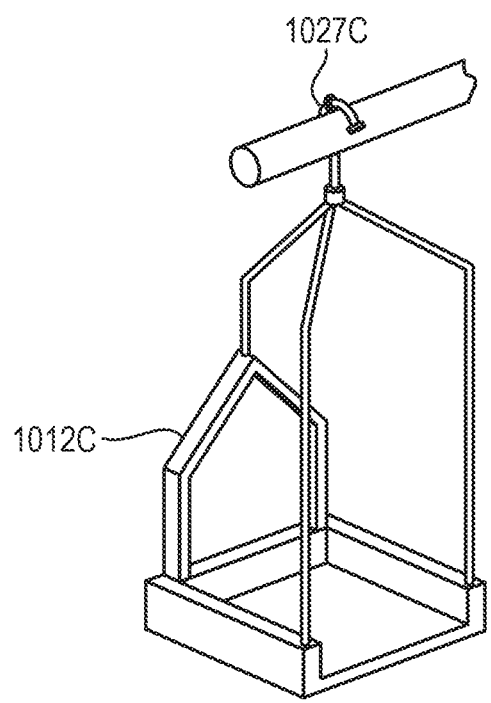

FIGS. 10A-C are schematic diagrams of example storage pods, which may be implemented as the storage pods in the systems described above. As shown in FIG. 10A, a first storage pod 1012A is a rectangular prism shape that is closed on five sides, and the remaining side is open to expose several different compartments, each of which may be used to store items directly or may house bins or other containers for storing items. The open side may have a removable cover and/or a barrier at the bottom of each compartment to prevent items from falling out of the compartments during storage pod movement or worker activity. A hanger 1027A couples the storage pod 1012A to a rail.

FIG. 10B illustrates a storage pod 1012B having an open configuration, where a frame supports multiple trays divided into several compartments for storing items. A hanger 1027B couples the storage pod 1012B to a rail.

FIG. 10C shows a storage pod 1012C configured to accommodate larger items or goods, and, in particular, may be structured to accommodate pallets loaded with bulk quantities of goods or large single items. Such pallets may be loaded onto and removed from the storage pod 1012C via a forklift.

Figure 11B:
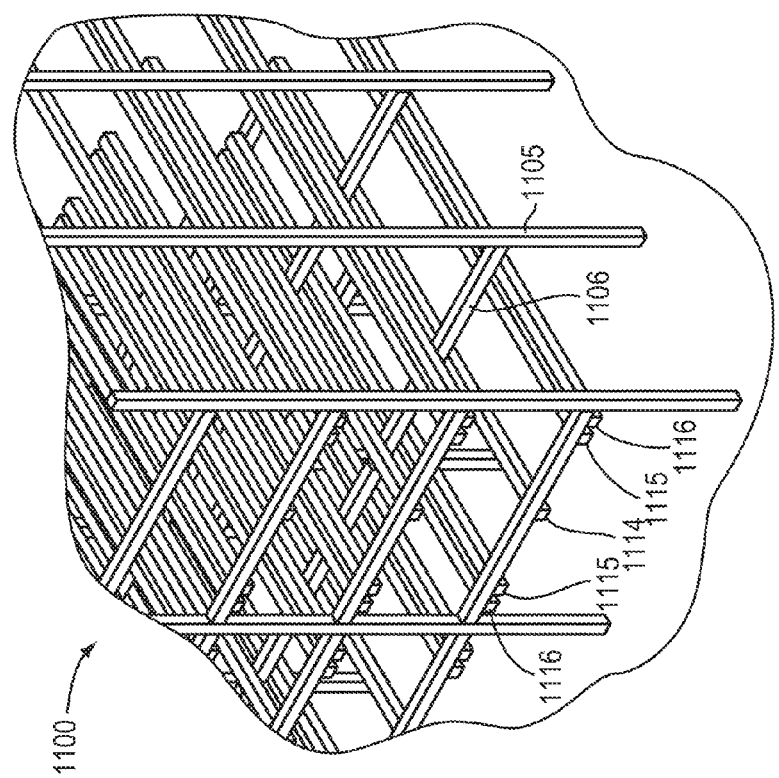
FIGS. 11A-E are schematic diagrams of a storage rail structure in one embodiment.
Figure 11A:
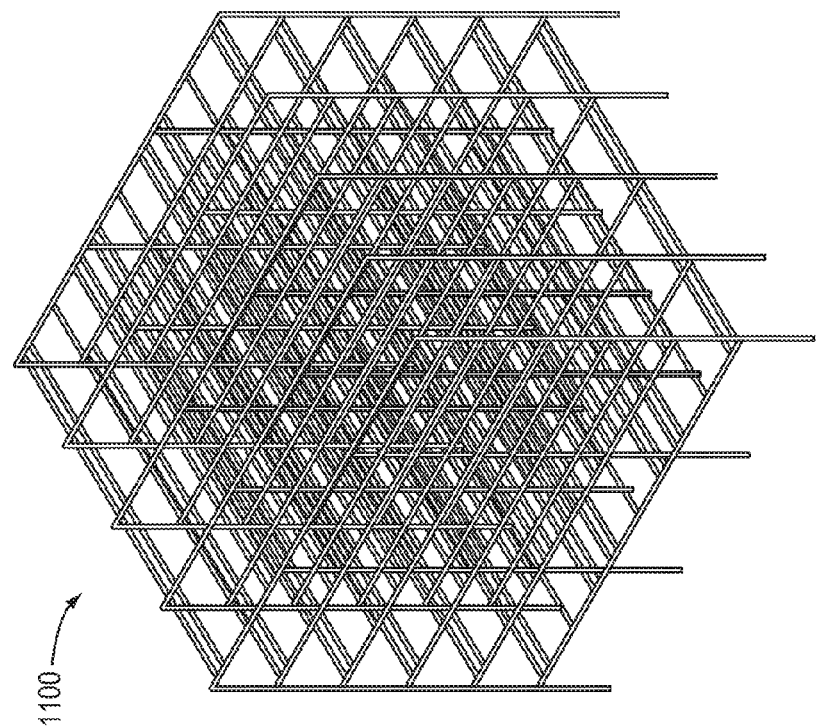

FIGS. 11A-E illustrate a storage rail structure 1100, which may be used to house storage pods, pickers, and movers in the systems described above. FIG. 11A shows an isometric view of the entire storage rail structure 1100, while FIG. 11B shows an expanded view of the lower front corner of the structure 1100. Here, it can be seen that the structure is supported by an arrangement of vertical support beams 1105 and horizontal support beams 1106. These beams 1105, 1106 support a number of different rails. In a given section of the structure 1100, two storage rails 1115 support storage pods in parallel rows. A center rail 1114 supports a picker to travel parallel to and between the two rows of storage pods. Two outer rails 1116 may serve to store movers when not in use, thereby providing a mover storage space (comparable to the mover storage area 186 in FIG. 1B) within the structure 1100.

Figure 11C:
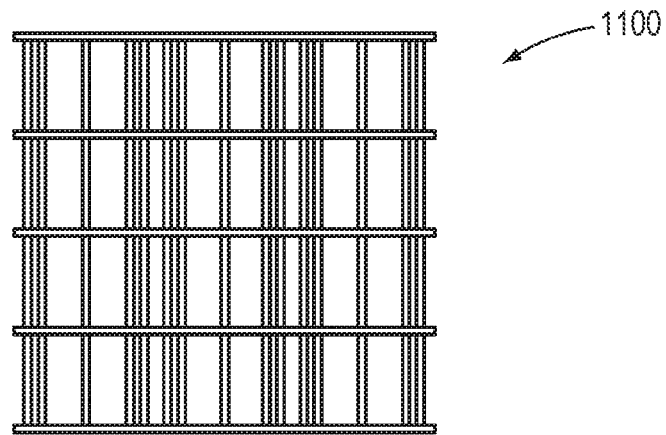
Figure 11D:
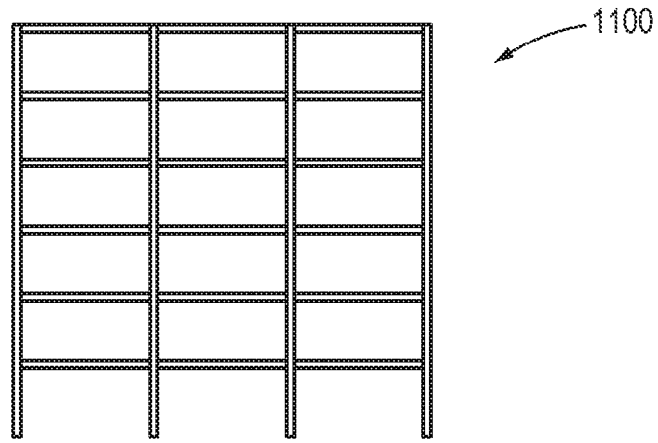
Figure 11E:
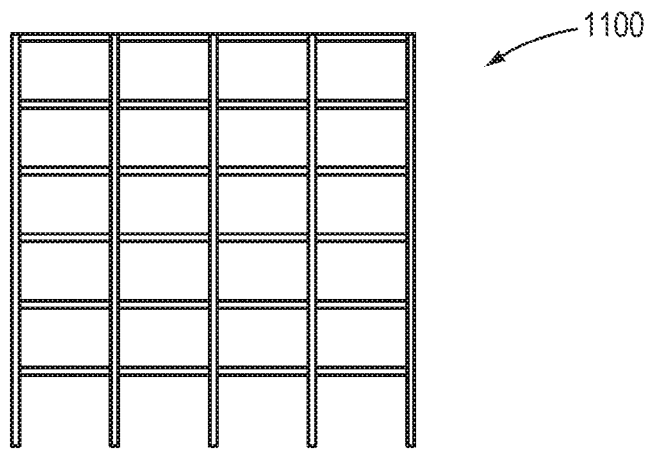

FIGS. 11C, 11D and 11E provide top, front, and side views, respectively, of the storage rail structure 1100.

Figure 12:
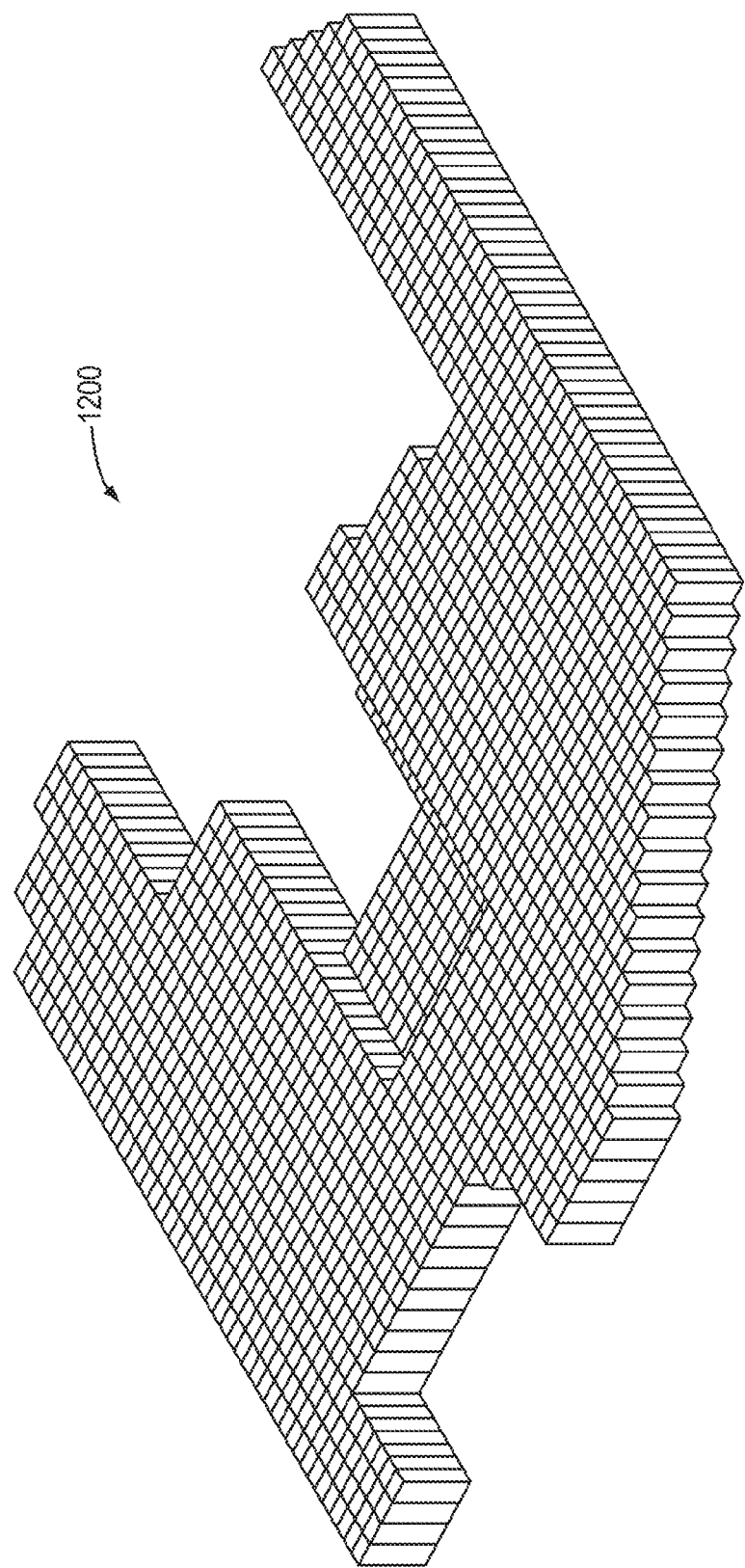
FIG. 12 is a schematic diagram of a storage rail structure in a further embodiment.

FIG. 12 illustrates a storage rail structure 1200 in a further embodiment. The structure 1200 may include the same features of the storage rail structure 1100 described immediately above, where the structure 1200 is made up of several "blocks," each block being equivalent to the structure 1100 of FIG. 11. The structure 1200 is provided to illustrate how a storage structure can be configured, in a modular fashion, to occupy any and all available storage space within a warehouse or other storage facility.

Figure 13:
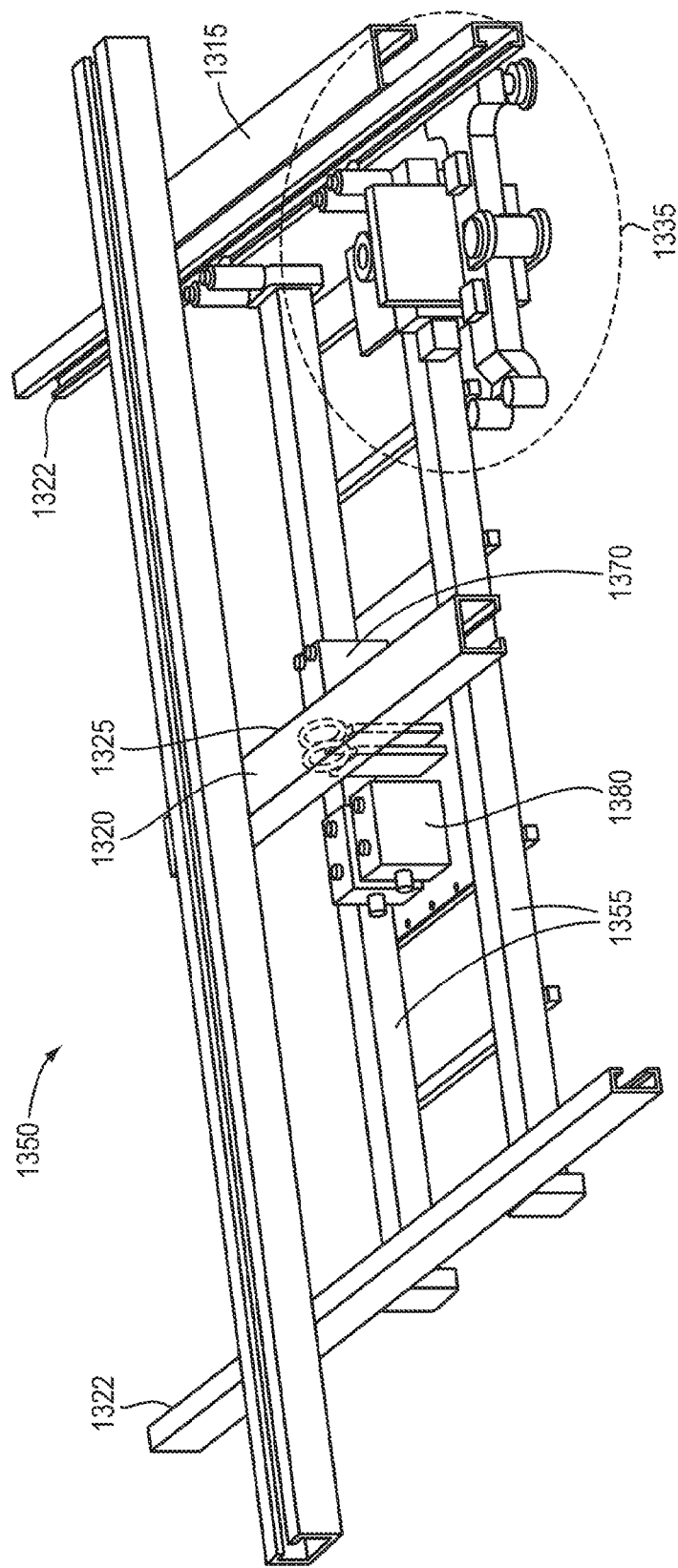
FIG. 13 is a schematic diagram of a picker device in one embodiment.

FIG. 13 illustrates an example picker 1350, which may be implemented in the storage systems described above, and may further incorporate features of the pickers (e.g., picker 150) described above. The picker 1350 may be mounted to the rails of a storage structure such as the structure 1100 described above with reference to FIGS. 11A-E. In particular, the picker 1320 can be mounted, via wheels 1325, to a center rail 1320, and includes arms 1355 that extend horizontally to be mounted to auxiliary rails 1322. The arms 1335 and auxiliary rails 1322 assist in stabilizing the picker 1350. The arms 1355 also support a track 1130 on which an actuator 1335 may move to and from the storage rail 1315, which supports the storage pods (not shown).

The actuator 1335 may perform a number of operations to manipulate the storage pods, including 1) identifying a selected storage pod for acquisition, 2) coupling with the hanger of the selected storage pod, 3) decoupling the hanger from the storage rail 1315, and 4) transferring the storage pod along the track 1330 toward the center rail 1320. When the picker 1350 arrives at the I/O area (e.g., I/O area 130 in FIG. 1B), the actuator 1355 may then couple the hanger to the rail network at the I/O area, and then decouple itself from the hanger. The picker 1350 may also include a main motor 1370 for driving the wheels 1325 to move the picker 1350 along the center rail 1320. Further, an on-board control circuit board 1380, including configured processors and other electronics, controls both the movement of the picker 1350 along the center rail 1320, as well as the operations of the actuator 1335.

In further embodiments, the picker 1350 may include a number of additional components and features to support the operations of the picker 1350, including those operations of the picker 150 described above with reference to FIGS. 1B, 2 and 3. For example, the picker 1350 may include any or all of the following features:

1) A breaking mechanism to stop the picker in motion quickly.

2) Sensors that detect the presence of obstacles. Such sensors may be most useful when oriented in the direction of the picker's current motion, thereby avoiding collisions. The sensors can be of any type, such as ultrasonic, laser, or infrared.

3) A communications link to the central control system (e.g., system 190 in FIG. 1B) to receive commands, status updates, and any other information, and to report back its own information to the control system. This communications link can be either wireless (using WiFi or other suitable technology) or wired through conduits along the rails.

4) A communications link that can directly transmit and receive information to/from other devices, such as movers, switches, etc. This link can enable the picker to coordinate its own actions with other machines, which is beneficial when the picker is interacting with those machines.

5) A power unit that powers up the picker. This power unit may be either wired or wireless. If wired, it may draw either AC or DC power. If wireless, the picker may include a power storage module (e.g., a battery).

6) Lighting fixtures on the outside to indicate the picker's status, such as "waiting for work," "carrying out work," and "out of order."

7) A horizontal arm/beam that can reach the storage rails on both sides. This arm/beam may be static or mobile. If static, it touches both storage rails at the same time and may have wheels that run on auxiliary rails mounted on the side of the storage rails. If mobile, the arm/beam may slide/telescope/swivel left and right.

8) At least one scanner/camera that reads barcodes/tags on hangers/storage pods to identify them, and/or barcodes/tags on rails to locate the picker itself. This scanner/camera may be installed on the arm/beam. If that arm/beam is mobile, it is possible that the picker can employ only one scanner/camera. If that arm/beam is static, the picker may employ two scanners/cameras, one on each end of the arm/beam.

9) A set of actuators, such as grippers, motor with gear, etc., mounted on a base/shaft, which can slide on the arm/beam described above. These actuators can grab onto a pod's hanger and perform other actions to unhook that storage pod. These actions may include moving up and down vertically, and rotating the hook without rotating the storage pod.

10) A set of sensors to enable the picker to accurately align the actuators described above with the hanger.

11) A mechanism to rotate a storage pod while carrying it.

12) A manual control interface for human workers to control the picker directly (rather than through the central control system). This can include a touch screen or a dashboard with joysticks, buttons, knobs, etc. The manual control interface may provide for maintenance or emergency use of the picker.

13) A mechanical part that can interact with other mechanical mechanisms along the rail, such as a nub that opens a gate of a hand-off location when approaching it.

14) Reserved places and connections for future functional extensions. A large number of different modules may optionally be mounted on the picker to complete additional special tasks, such as cleaning the rail tracks, inspecting equipment along the rails, real-time surveillance, maintenance work, and emergency response.

15) An on-board control unit that organizes, coordinates, and optionally records all the picker's activities.

Figure 14:
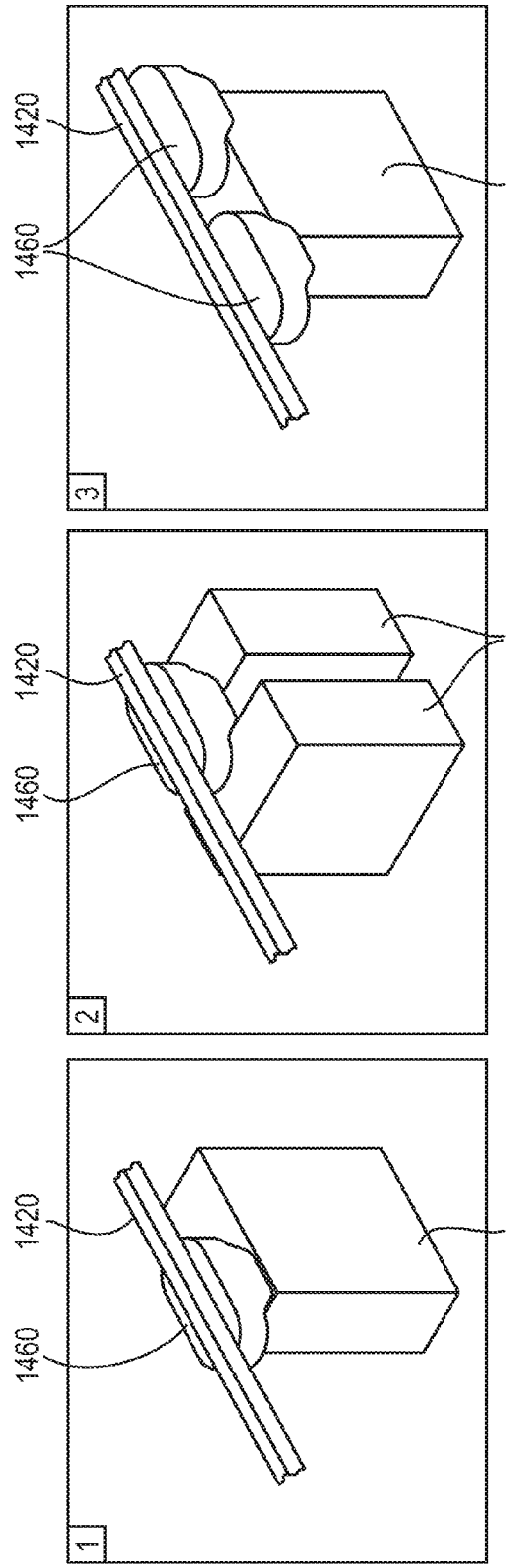
FIGS. 14A-C are schematic diagrams of a mover device in one embodiment.

FIGS. 14A-C illustrate different configurations that may be taken by a mover 1460 for transporting one or more storage pods. In FIG. 14A, a mover 1460, coupled to a rail 1420, is coupled to and carries a single storage pod 1412A oriented lengthwise along the rail 1420. FIG. 14B illustrates a mover 1460 coupled to a pair of storage pods 1412B, each of which is oriented lengthwise perpendicular to the rail 1420. In FIG. 14C, a pair of movers 1460 are combined to move a single storage pod 1412C oriented lengthwise along the rail 1420. Each of the configurations in FIGS. 14A-C may have appropriate use in a range of applications, depending, for example, on the size and weight of the storage pods 1412A-C, and the space available in which to move the storage pods 1412A-C.

Figure 15:
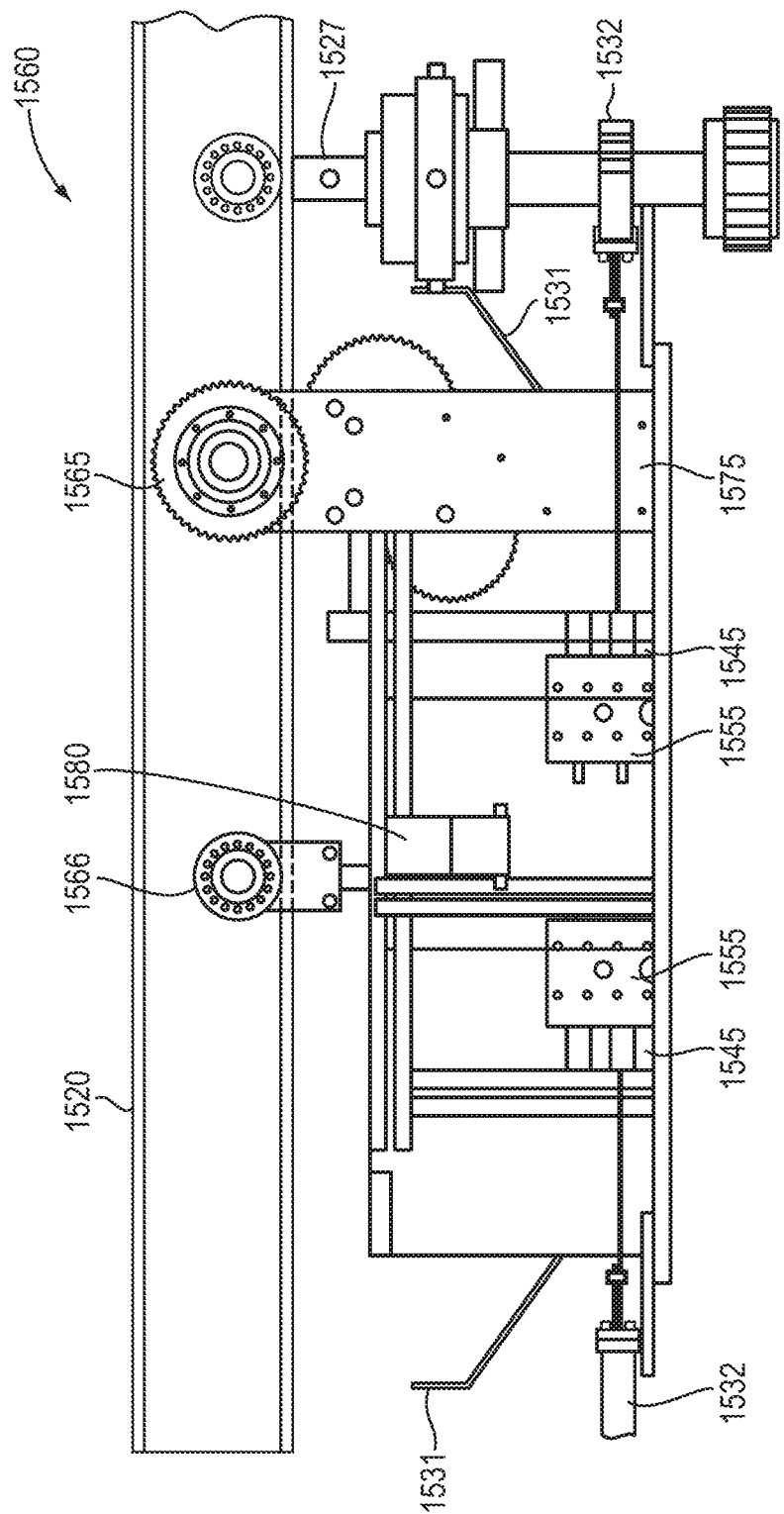
FIG. 15 is a schematic diagram of a mover device in a further embodiment

FIG. 15 illustrates an example mover 1560, which may be implemented in the storage systems described above, and may further incorporate features of the movers (e.g., mover 160) described above. The mover 1560 may be mounted to a rail 1520 via pairs of powered wheels 1565 and unpowered wheels 1566, and interacts with a hanger 1527 (e.g., a hanger supporting a storage pod (not shown)). To interact with the hanger 1527, the mover 1560 includes a gripper 1532 to grip the hanger 1527, as well as a presser 1531 that pushes a respective rod at the hanger 1527, thereby unlocking the hanger 1527. The mover 1560 may include a respective gripper 1532 and presser 1531 at both the front and back ends of the mover 1560, enabling the mover greater versatility in engaging with one or more storage pods.

A pair of motors 1555 power the operation of the grippers 1532, and additional motors (not shown) power the powered wheels 1565 via a gearbox 1575, enabling the mover 1560 to move along the rail 1520. A pair of batteries 1545 provides power to the motors 1555. A scanner 1580 may operate to read tags or barcodes on the rail in order for the mover 1560 to locate itself within the rail network.

In further embodiments, the mover 1560 may include a number of additional components and features to support the operations of the picker 1560, including those operations of the mover 160 described above with reference to FIGS. 1B, 2 and 3. For example, the mover 1560 may include any or all of the following features:

1) A breaking mechanism to stop the mover in motion quickly.

2) Sensors that detect the presence of obstacles. Such sensors may be most useful when oriented in the direction of the mover's current motion, thereby avoiding collisions. The sensors can be of any type, such as ultrasonic, laser, or infrared.

3) A communications link to the central control system (e.g., system 190 in FIG. 1) to receive commands, status updates, and any other information, and to report back its own information to the control system. This communications link can be either wireless (using WiFi or other suitable technology) or wired through conduits along the rails.

4) A communications link that can directly transmit and receive information to/from other devices, such as movers, switches, etc. This link can enable the mover to coordinate its own actions with other machines, which is beneficial when the mover is interacting with those machines.

5) A power unit that powers up the mover. This power unit may be either wired or wireless. If wired, it may draw either AC or DC power. If wireless, the mover may include a power storage module (e.g., a battery).

6) Lighting fixtures on the outside to indicate the mover's status, such as "waiting for work," "carrying out work," and "out of order."

7) A mechanism to rotate a storage pod while carrying it.

8) A manual control interface for human workers to control the mover directly (rather than through the central control system). This can include a touch screen or a dashboard with joysticks, buttons, knobs, etc. The manual control interface may provide for maintenance or emergency use of the mover.

9) A mechanical part that can interact with other mechanical mechanisms along the rail, such as a nub that opens a gate of a hand-off location when approaching it.

10) Reserved places and connections for future functional extensions. A large number of different modules may optionally be mounted on the mover to complete additional special tasks, such as cleaning the rail tracks, inspecting equipment along the rails, real-time surveillance, maintenance work, and emergency response.

11) An on-board control unit that organizes and coordinates the mover's activities.

FIGS. 16A-D illustrate an example application of a pusher 1670. As described above (e.g., with reference to the pusher 170 of FIG. 1B), a pusher may occupy a predefined segment of the rail network and push any objects (e.g., storage pods and movers) in a single direction along the predefined rail segment. The pusher may move continuously back and forth along the rail segment. One application of a pusher, described above, is to move storage pods from an I/O area into a storage rail, and to move storage pods farther along the storage rail. A further application, shown in FIGS. 16A-D, is to assist a mover in moving a storage pod along a given rail segment. Such an application may be useful, for example, at a rail segment having an elevated incline, through which the mover may have insufficient power to move the storage pod.

Figure 16A:
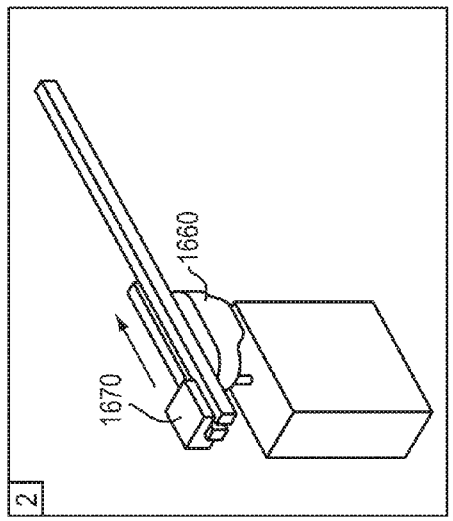
FIGS. 16A-D are schematic diagrams of a pusher device in one embodiment.
Figure 16B:
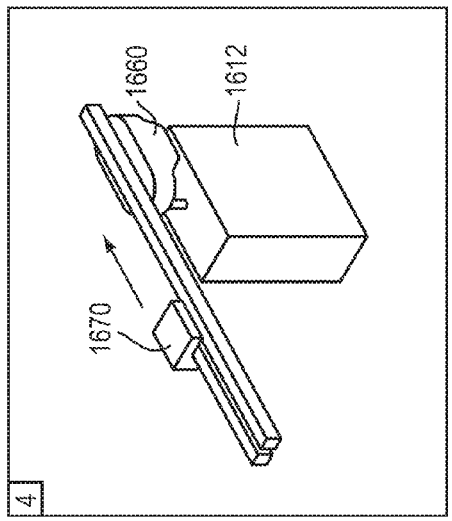
Figure 16C:
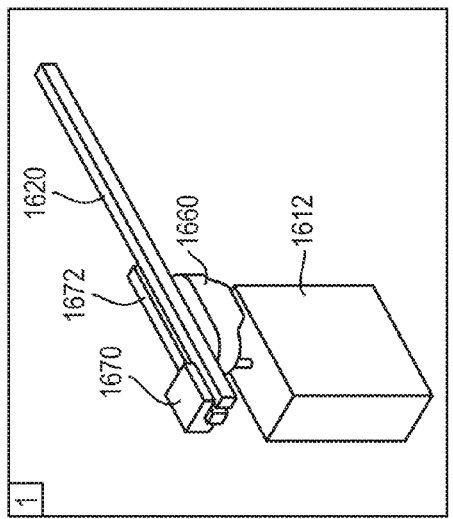
Figure 16D:
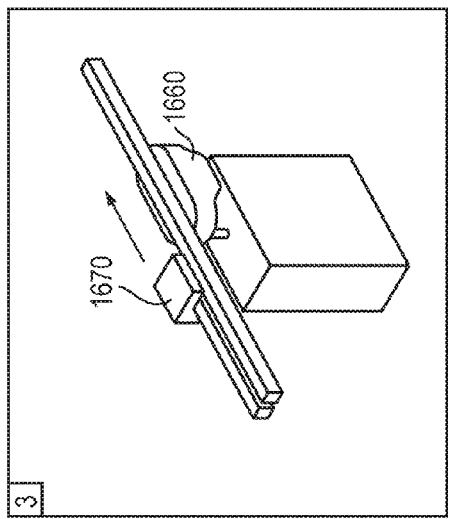

As shown in FIG. 16A, a pusher 1670 occupies a supplemental rail segment 1672 attached to the main rail 1620. The pusher 1670 generally pushes rightward any objects on the rail 1620 adjacent to the supplemental rail segment 1672. Here, a mover 1660 is coupled to the rail 1620 and is carrying a storage pod 1612. Thus, the pusher 1670 pushes the mover 1660 rightward, as shown in FIG. 16B. The pusher 1670 continues pushing the mover 1660 until the pusher 1670 reaches the end of the supplemental rail segment 1672, as shown in FIG. 16C. Once this occurs, the mover 1660 continues moving the storage pod 1612 as shown in FIG. 16D, while the pusher 1670 changes direction to return to the opposite end of the supplemental rail segment 1672.

Figure 17:
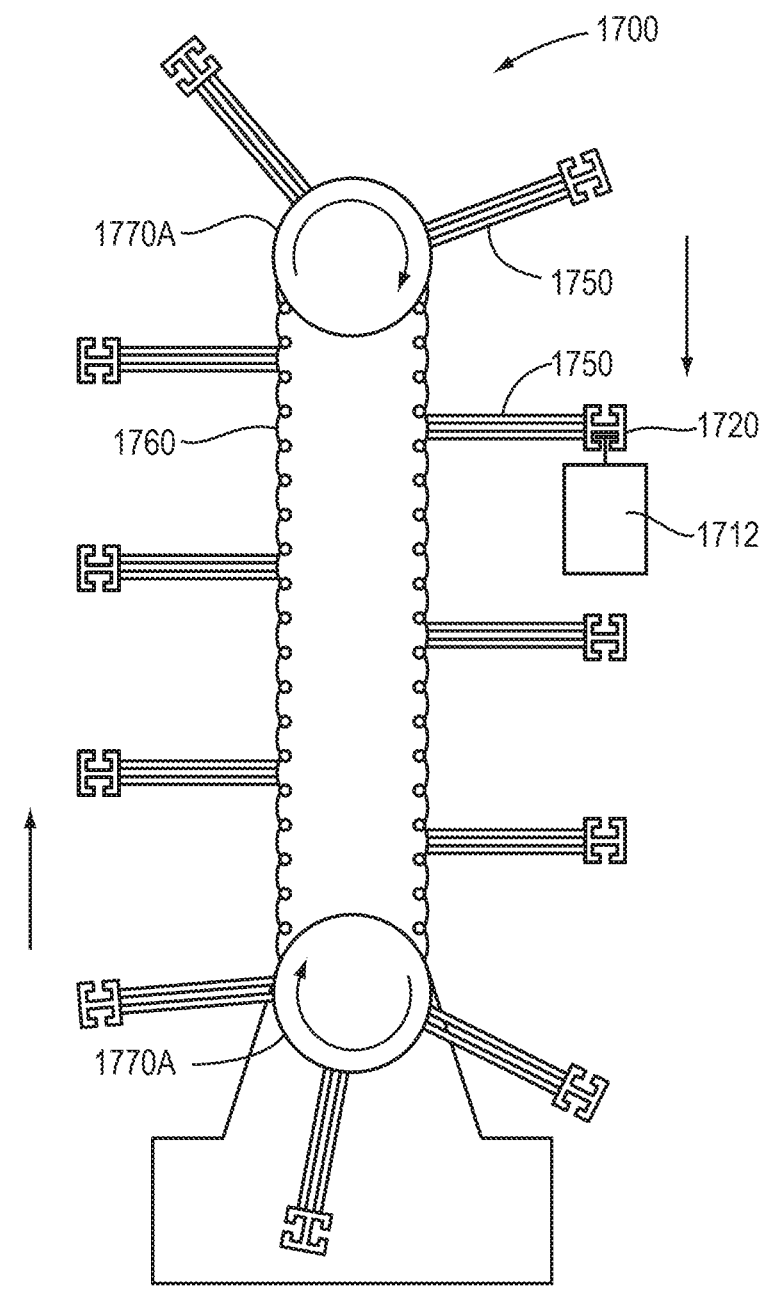
FIG. 17 is a schematic diagram of a vertical conveyor lift in one embodiment.

FIG. 17 illustrates a vertical transporter 1700. In embodiments employing a rail network and/or storage rails occupying plural vertical levels, transportation between levels may be accomplished by inclined rail segments, as described above. Alternatively, the vertical transporter 1700 may be employed. The vertical transporter 1700 includes a belt 1760 connected to cylindrical drivers 177A-B, which turn the belt in a given direction. In turn, a number of arms 1750, which are coupled to the belt 1760, ascend and descend simultaneously. At the end of each arm 1760, a double sided rail segment 1720 may support a mover (not shown), a storage pod 1712, and/or a mover coupled to a storage pod.

When a mover must go to a different level using the vertical transporter, it stops at the edge of rails that can connect to the rail segments 1750 of the vertical transporter, and waits until there is an empty segment aligned with it. Then the mover moves onto that empty segment. The vertical transporter starts moving again. The mover waits until its rail segment is aligned with the level of its destination, and then departs from the vertical transporter 1700.

Figure 18:
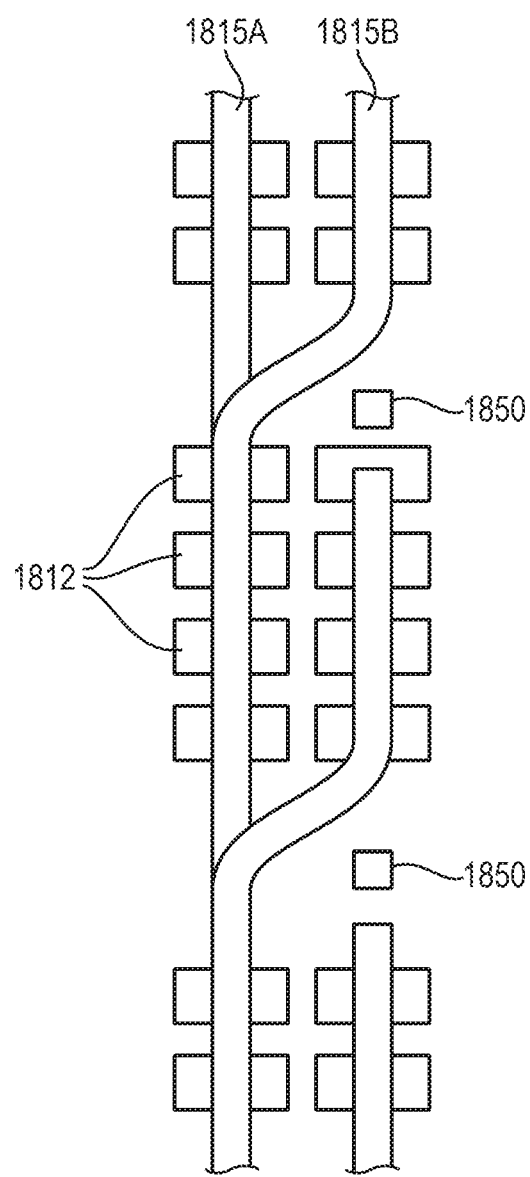
FIG. 18 is a schematic diagram of a branched rail system in one embodiment.

FIG. 18 illustrates a branched rail configuration. Embodiments of the invention may be deployed in buildings having support columns throughout. As a result, some building columns may be located within the storage area. To accommodate these columns, the storage rails may be configured in a branched arrangement as shown in FIG. 18. Here, building columns 1850 are located in the path of storage rail 1815B. In order to utilize storage space between the columns 1850 and provide service to the storage rail 1815B, segments of the storage rail 1815B are branched from a neighboring storage rail 1815A. Active or passive rail switches, such as those described above with reference to FIG. 9A-B, may be employed to facilitate movement of storage pods 1812 between the rails 1815A-B.

Further example embodiments of the present invention may be configured using a computer program product; for example, controls may be programmed in software for implementing example embodiments of the present invention. Further example embodiments of the present invention may include a non-transitory computer-readable medium containing instruction that may be executed by a processor, and, when executed, cause the processor to complete methods described herein. It should be understood that elements of the block and flow diagrams described herein, particularly with reference to FIGS. 1B, 2, and 3, may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A system for storing and retrieving items, the system comprising:
   a first rail system configured to support a plurality of storage containers;
   a second rail system;
   a picker device coupled to the second rail system, the picker device configured to decouple a selected storage container of the plurality of storage containers from the first rail system and transport the selected storage container along a first segment of the second rail system; and
   a mover device coupled to the second rail system, the mover device configured to receive the selected storage container following the transport by the picker device and transport the selected storage container along a second segment of the second rail system.

2. The system of claim 1, wherein the second segment of the second rail system extends to a human workstation, the mover device being further configured to move the selected storage container to the human workstation to enable a user to access the selected storage container.

3. The system of claim 2, wherein the human workstation includes a plurality of access locations, the mover configured to move the selected storage container to a selected one of the access locations based on a received command from a controller.

4. The system of claim 2, wherein the mover is further configured to position the storage container at the human workstation to enable the user to perform at least one of 1) removing at least one item from the selected storage container, and 2) transferring at least one item to the selected storage container.

5. The system of claim 2, wherein the second rail system includes at least one moveable segment at the human workstation, the at least one movable segment enabling the selected storage container to be repositioned based on a selection by the user.

6. The system of claim 2, wherein, following the access by the user, the mover device is further configured to move the selected storage container toward the first rail system.

7. The system of claim 6, wherein the mover device is further configured to move the storage container to the first rail system.

8. The system of claim 6, wherein the picker device is further configured to receive the selected storage container from the mover device and couple the selected storage container to the first rail system.

9. The system of claim 8, wherein the picker device is further configured to couple the selected storage container to a given location at the first rail device.

10. The system of claim 6, wherein the mover device is further configured to move the selected storage container to a predefined location at the first rail system, the predefined location being a location at which the plurality of storage containers are coupled to the first rail system.

11. The system of claim 10, further comprising a pusher device, the pusher device being configured to move the selected storage container along the first rail system.

12. The system of claim 11, wherein the pusher device is further configured to move more than one of the plurality of storage containers concurrently.

13. The system of claim 1, wherein the mover device is further configured to move to a designated portion of the second rail system when not assigned to a task.

14. The system of claim 1, wherein the first rail system includes an arrangement of rail segments extending parallel to one another, each of the rail segments supporting a respective subset of the plurality of storage containers.

15. The system of claim 14, wherein the first segment of the second rail system includes a portion extending parallel to and between at least two of the arrangement of rail segments.

16. The system of claim 15, wherein the picker device is further configured to move along the portion of the second rail system to decouple the selected storage container from either of the at least two rail segments.

17. The system of claim 14, wherein the rail segments are positioned at vertically distinct locations, a first of the two rail segments supporting the respective subset of the plurality of storage containers above at least one of the rail segments.

18. The system of claim 14, further comprising a connector rail segment extending between two of the rail segments extending parallel to one another, the connector rail segment enabling storage containers to relocate between the two rail segments.

19. The system of claim 1, wherein each of the plurality of storage containers includes a respective hanger configured to couple to the first rail system and enable the storage container to move along the first rail system.

20. The system of claim 19, wherein the hanger further includes a mounting feature configured to be engaged by the picker device to decouple the storage container from the first rail system.

21. The system of claim 19, wherein the hanger includes an orienting feature configured to be engaged by the mover device to rotate the storage container independent of the hanger.

22. The system of claim 1, wherein the picker device further includes a scanner, the picker device being configured to identify the selected storage container based on a corresponding identifier tag read by the scanner.

23. The system of claim 22, wherein the picker device is further configured to determine an approximate location of the selected storage container based on a present sequence of the plurality of storage containers.

24. The system of claim 23, wherein the picker device is further configured to scan the corresponding identifier tag of each of the plurality of the plurality of storage containers as the picker device passes each of the plurality of storage containers, the picker device determining the approximate location based on the scan and the present sequence.

25. The system of claim 1, wherein the picker device further includes an arm configured to engage with the selected storage container and decouple the selected storage container from the first rail system.

26. The system of claim 1, wherein the picker device is further configured to couple the selected storage container to the second rail system.

27. The system of claim 1, further including a controller, the controller being configured to control the picker device and mover device to transfer the plurality of storage containers between the first rail system and at least one human workstation accessible to the mover device via the second rail system.

28. The system of claim 27, further comprising:
a plurality of picker devices coupled to the first segment of the second rail system, the plurality of picker devices including the picker device; and
a plurality of mover devices coupled to the second segment of the second rail system, the plurality of mover devices including the mover device;
wherein the controller is further configured to control the plurality of picker devices and plurality of mover devices to transfer the plurality of storage containers between the first rail system and the at least one human workstation.

29. The system of claim 28, wherein the controller, in response to detecting an intrusion proximate to a subset of the first and second rail systems, is further configured to control the plurality of picker devices and the plurality of mover devices to avoid the subset of the first and second rail systems.

30. The system of claim 1, wherein the first and second rail systems are connected at at least one junction, the mover device being configured to receive the selected storage container at the at least one junction.

31. A method of storing and retrieving items, the method comprising:
receiving an order for at least one item;
identifying a storage container containing the at least one item, the storage container being one of a plurality of storage containers supported by a first rail system;
controlling a picker device to 1) move along a second rail system to identify the storage container, 2) decouple the storage container from the first rail system, and 3) transport the selected storage container along a first segment of the second rail system; and
controlling a mover device to transport the selected storage container along a second segment of the second rail system.

32. The method of claim 31, further comprising controlling the mover device to move the selected storage container to a human workstation to enable a user to access the selected storage container.

33. The method of claim 32, wherein the human workstation includes a plurality of access locations, and further comprising controlling the mover to move the selected storage container to a selected one of the access locations based on a received command from a controller.

34. The method of claim 32, further comprising controlling the mover device to position the storage container at the human workstation to enable the user to perform at least one of 1) removing at least one item from the selected storage container, and 2) transferring at least one item to the selected storage container.

35. The method of claim 32, further comprising, following the access by the user, controlling the mover device to move the selected storage container to the first segment of the second rail system.

36. The method of claim 35, further comprising controlling the mover device to move the storage container to the first rail system.

37. The method of claim 35, further comprising controlling the mover device to move the selected storage container to a predefined location at the first rail system, the predefined location being a location at which the plurality of storage containers are coupled to the first rail system.

38. The method of claim 37, further comprising controlling a pusher device to move the selected storage container along the first rail system.

39. The method of claim 38, further comprising controlling the pusher device to move more than one of the plurality of storage containers concurrently.

40. The method of claim 31, further comprising controlling the mover device to move to a designated portion of the second rail system when not assigned to a task.

41. The method of claim 31, wherein the first rail system includes an arrangement of rail segments extending parallel to one another, each of the rail segments supporting a respective subset of the plurality of storage containers.

42. A system for storing and retrieving items, the system comprising:
a first rail system configured to support a plurality of storage containers;
a second rail system;
a customer kiosk including an interface configured to receive a request for an item by a customer;
a picker device operatively coupled to the customer kiosk to perform an action responsive to a signal corresponding to the request, the picker device coupled to the second rail system, the picker device configured to decouple a selected storage container of the plurality of storage containers from the first rail system and transport the selected storage container along a first segment of the second rail system, the selected storage container housing the item; and
a mover device operatively coupled to the customer kiosk to perform an action responsive to a signal corresponding to the request, the mover device coupled to the second rail system, the mover device configured to receive the selected storage container following the transport by the picker device and transport the selected storage container along a second segment of the second rail system to the customer kiosk to enable the customer to access the item.

43. A system for storing and retrieving items, the system comprising:
- a rail system configured to support a plurality of storage containers;
- a controller configured to issue a command to retrieve a selected storage container of the plurality of storage containers; and
- a plurality of picker devices, each of the picker devices configured, responsive to the command, to locate the selected storage container based on a present sequence of the plurality of storage containers along the rail system and an input identifying at least one of the plurality of storage containers proximal to the picker.

44. The system of claim 43, wherein each of plurality of picker devices is further configured to scan the corresponding identifier tag of each of the plurality of the plurality of storage containers as the picker device passes each of the plurality of storage containers, the picker device determining an approximate location of the selected storage container based on the scan and the present sequence.

* * * * *